United States Patent
Ohta

(10) Patent No.: US 7,379,841 B2
(45) Date of Patent: May 27, 2008

(54) INCLINATION CALCULATION APPARATUS AND INCLINATION CALCULATION PROGRAM, AND GAME APPARATUS AND GAME PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 33 days.

(21) Appl. No.: 11/408,963

(22) Filed: Apr. 24, 2006

(65) Prior Publication Data

US 2007/0225938 A1      Sep. 27, 2007

(30) Foreign Application Priority Data

Mar. 22, 2006    (JP) .............................. 2006-079485

(51) Int. Cl.
G01C 9/00          (2006.01)

(52) U.S. Cl. ...................................... 702/154
(58) Field of Classification Search ................. 702/154
See application file for complete search history.

(56) References Cited

U.S. PATENT DOCUMENTS

| 6,229,102 | B1 * | 5/2001 | Sato et al. ............... 178/19.01 |
| 2001/0050672 | A1 * | 12/2001 | Kobayashi ................ 345/158 |
| 2002/0003416 | A1 * | 1/2002 | Sagasaki et al. ........... 318/600 |
| 2002/0012014 | A1 * | 1/2002 | Mohri ....................... 345/863 |
| 2003/0011573 | A1 * | 1/2003 | Villet et al. ............... 345/169 |
| 2003/0078086 | A1 * | 4/2003 | Matsuyama et al. ........... 463/3 |
| 2005/0151448 | A1 * | 7/2005 | Hikida et al. .............. 310/338 |
| 2005/0283988 | A1 * | 12/2005 | Sato et al. .................. 33/356 |
| 2006/0139619 | A1 * | 6/2006 | Fujii et al. ............... 356/4.03 |
| 2007/0060228 | A1 * | 3/2007 | Akasaka et al. .............. 463/1 |
| 2007/0233424 | A1 * | 10/2007 | Ohta ......................... 702/154 |

FOREIGN PATENT DOCUMENTS

JP          2001-159951         6/2001

* cited by examiner

Primary Examiner—John Barlow
Assistant Examiner—Cindy D. Khuu
(74) Attorney, Agent, or Firm—Nixon & Vanderhye P.C.

(57) ABSTRACT

An inclination calculation apparatus within a game machine computes an inclination of an input device having an acceleration sensor/detector capable of simultaneously detecting an acceleration in at least two axial directions. Programmed logic circuitry within the apparatus consecutively generates preliminary data which represents an inclination and which is uniquely determined from acceleration data consecutively output from the acceleration sensor/detector. Programmed logic circuitry within the apparatus also consecutively computes a new/updated inclination based on a previously computed inclination, an acceleration due to gravity and a current inclination represented by the preliminary data, wherein the new/updated inclination is computed to have a direction oriented between the previously computed inclination and a current inclination represented by the preliminary data by a degree to which the acceleration due to gravity contributes to the acceleration data.

20 Claims, 15 Drawing Sheets

INCLINATION CALCULATION APPARATUS AND INCLINATION CALCULATION PROGRAM, AND GAME APPARATUS AND GAME PROGRAM

CROSS REFERENCE OF RELATED APPLICATION

The disclosure of Japanese Patent Application No. 2006-79485 is incorporated herein by reference.

BACKGROUND OF THE INVENTION

1. Field of the Invention

The present invention relates to an inclination calculation apparatus and an inclination calculation program, and more specifically to an inclination calculation apparatus and an inclination calculation program for calculating an inclination of an input device using an output from an acceleration detection device included in the input device.

2. Description of the Background Art

Conventionally, technologies for calculating an inclination of a device including acceleration detection means have been proposed. For example, patent document 1 (Japanese Laid-Open Patent Publication No. 2001-159951) describes an information processing device including acceleration detection means. In this information processing device, an inclination of the device is calculated from an acceleration detected by the acceleration detection means (an angle of the device with respect to a direction of gravity), and an operation command is generated using the calculated inclination.

This information processing device has a built-in two-axial acceleration sensor. The inclination angle of the device is calculated from a component of the acceleration which is detected in two axial directions when the device is inclined. If the detected acceleration represents only an acceleration of gravity, the inclination of the device can be accurately calculated from the detected acceleration. However, the detected acceleration possibly includes an acceleration of a noise component provided by vibration of the hand of a user or the like in addition to the acceleration of gravity. Therefore, the device described in the above-mentioned publication executes processing of extracting a low-frequency component of the detected acceleration; for example, the device calculates a time average of the detected acceleration. In addition, this information processing device assumes that a change in the acceleration caused by a motion of a human being is smooth and slow. When the low-frequency component does not change during a predetermined pause period, the device determines that the user has performed some operation on the device and processes to change a value to be output as an inclination of the device (inclination operation information). By such processing, the acceleration of the noise component is eliminated from the acceleration detected by the acceleration detection means (acceleration sensor), and thus the inclination of the device can be calculated.

According to the technology described in patent document 1, the device executes the processing of calculating a time average and the processing of determining whether or not the detected acceleration has changed during a predetermined pause period, in order to calculate the inclination of the device. Such processing causes a delay in providing the inclination operation information. In other words, the above-described technology is not capable of calculating the inclination of the device in real time from the detected value of the acceleration. Also according to the technology described in patent document 1, characteristic information to be used for the above-mentioned processing for generating the inclination operation information needs to be prepared in accordance with the type of the operation. Therefore, the contents of the processing needs to be changed in accordance with the characteristic information. This restricts the range of applicable operations and complicates the processing.

SUMMARY OF THE INVENTION

Therefore, at least one aspect of the non-limiting illustrative exemplary implementation disclosed herein is to provide an inclination calculation apparatus and an inclination calculation program capable of computing an inclination of a device in real time using an acceleration detected an by acceleration detector sensor.

Reference numerals, additional explanations and the like shown within parentheses in this section of the specification indicate correspondence with elements within the Figures illustrating the non-limiting example implementations described herein.

In a first non-limiting aspect, applicant's illustrative example implementation disclosed herein is directed to an inclination calculation apparatus (game apparatus 3) for computing an inclination of an input device (controller 7) which includes an acceleration detector (acceleration sensor 37) that is capable of repeatedly detecting an acceleration in at least two axial directions. The inclination calculation apparatus comprises preliminary data generation means (CPU 10, etc. for executing step S13 or S29; hereinafter, only the corresponding step numbers will be mentioned) and inclination calculation means (S17 and S18, or S33 and S34). The preliminary data generation means sequentially generates preliminary data (531) which represents an inclination and is uniquely determined from acceleration data (521) output from the acceleration detection means. The inclination calculation means sequentially calculates a new inclination (i.e., repeatedly computes corresponding new/updated inclination values) by making an inclination previously calculated closer to an inclination represented by the preliminary data at a predetermined angle/degree (effectiveness k). (i.e., by using an inclination determined by using an "effectiveness" value "k" which represents a predetermined inclination vector angle/degree between a previously computed inclination vector and a current inclination represented by the preliminary data.)

In a second non-limiting aspect of applicant's illustrative example implementation disclosed herein, the preliminary data may represent an inclination of the input device under an assumption that the acceleration data represents only an acceleration of gravity.

In a third non-limiting aspect of applicant's illustrative example implementation disclosed herein, the acceleration detection means may be capable of detecting an acceleration in three axial directions (x-y-z directions). In this case, the inclination calculation means calculates an inclination in two axial directions (x-y directions) among the three axial directions. The preliminary data generation means generates preliminary data representing an inclination in two axial directions, corresponding to the inclination calculated by the inclination calculation means, from the acceleration data representing the acceleration in the three axial directions.

In a fourth non-limiting aspect of applicant's illustrative example implementation disclosed herein, the inclination calculation apparatus may further comprise magnitude calculation means (S11 or S21) for calculating a magnitude of the acceleration represented by the acceleration data. In this case, the inclination calculation means sequentially varies the degree in accordance with the magnitude of the acceleration, such that the degree is greater as the magnitude of the acceleration calculated by the magnitude calculation means is closer to a magnitude of the acceleration of gravity.

In a fifth non-limiting aspect of applicant's illustrative example implementation disclosed herein, the inclination calculation apparatus may further comprise magnitude calculation means (S11 or S21) for calculating a magnitude of the acceleration represented by the acceleration data. In this case, the inclination calculation means calculates an inclination only when a difference between the magnitude of the acceleration calculated by the magnitude calculation means and a magnitude of the acceleration of gravity is equal to or less than a predetermined threshold value.

In another non-limiting aspect, applicant's illustrative example implementation disclosed herein may be provided in the form of a computer-readable storage medium having stored thereon an inclination calculation program for causing a computer of an inclination calculation apparatus to execute the above-described invention. The present invention may be provided in the form of a game apparatus using an inclination calculated by the above invention as an operation input for a game, or in the form of a computer-readable storage medium having stored thereon a game program for causing a computer of the game apparatus to execute the above-described invention.

According to the first aspect, an inclination of the input device is calculated based on an inclination determined from the acceleration data and an inclination calculated previously, instead of regarding an inclination determined from the acceleration data as the inclination of the input device. Thus, even when the acceleration rapidly changes as a result of an influence of components other than the acceleration of gravity being added to the output from the acceleration detection means, the influence can be alleviated. Therefore, according to the first aspect, a reasonably accurate inclination can be obtained constantly. In addition, since the information used for calculating an inclination of the input device is an inclination determined from the acceleration data and an inclination calculated previously, the inclination of the input device can be calculated in real time.

According to the second aspect, a preliminary vector can be easily obtained from the output of the acceleration detection means.

According to the third aspect, an inclination in two axial directions from an acceleration in three axial directions detected by the acceleration detection means.

According to the fourth aspect, the inclination calculation means varies a predetermined degree in accordance with the closeness between the magnitude of the acceleration detected by the acceleration detection means and the magnitude of the acceleration of gravity. Thus, when the detected acceleration is significantly influenced by components other than the acceleration of gravity, i.e., when the inclination represented by the generated data is determined to be significantly offset from the accurate inclination, the inclination calculated by the inclination calculation means is close to the inclination calculated previously. By contrast, when the detected acceleration is not much influenced by components other than the acceleration of gravity, i.e., when the inclination represented by the generated data is determined to be close to the accurate inclination, the inclination calculated by the inclination calculation means is close to the inclination represented by the generated data. Thus, the degree at which the generated data influences the inclination calculated by the inclination calculation means can be varied in accordance with the determination result on whether or not the inclination represented by the generated data is close to the accurate inclination (inclination to be calculated). Therefore, the inclination of the input device can be more accurately calculated.

According to the fifth aspect, when the difference between the magnitude of the acceleration detected by the acceleration detection means and the magnitude of the acceleration of gravity is equal to or greater than a threshold value, the inclination is not calculated using the generated data and the inclination calculated previously. In the above case, the acceleration detected by the acceleration detection means includes many components other than the acceleration of gravity. Therefore, it is difficult to accurately calculate the inclination. According to the fifth aspect, the inclination is not calculated in such a case. Thus, an inaccurate inclination can be prevented from being calculated.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
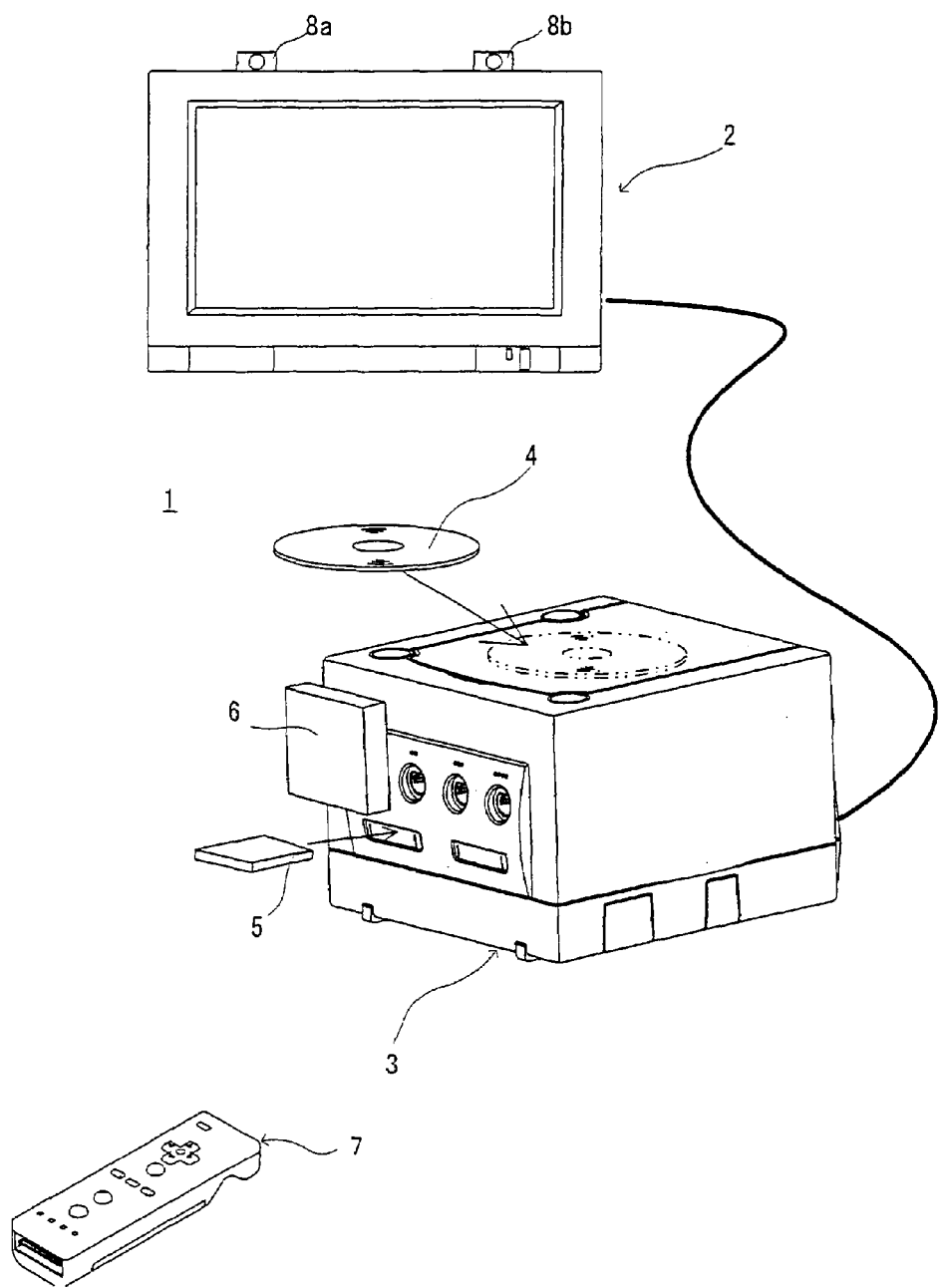
FIG. 1 is an external view of a game system including a game apparatus having an exemplary inclination calculation apparatus.

With reference to FIG. 1, a game system 1 including a game apparatus as an example of an inclination calculation apparatus according to a first non-limiting illustrative example implementation will be described. FIG. 1 is an external view illustrating the game system 1. In the following exemplary description, example the game apparatus described is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker via a connection cord, and a controller 7 for giving operation data to the game apparatus 3. Two markers 8a and 8b are provided in the vicinity of the monitor 2 (above the screen of the monitor 2 in FIG. 1). The markers 8a and 8b are specifically infrared LEDs, and each outputs infrared light forward from the monitor 2. The game apparatus 3 is connected to a receiving unit 6 via a connection terminal. The receiving unit 6 receives operation data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 has, on a top main surface thereof, a power ON/OFF switch, a game processing reset switch, and an OPEN switch for opening a top lid of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. The player playing with the game apparatus 3 can enjoy the game by operating the controller 7 while watching the game image displayed on the display screen of the monitor 2.

The controller 7 wirelessly transmits operation data from a communication section 36 included therein (described later) to the game apparatus 3 connected to the receiving unit 6, using the technology of, for example, Bluetooth®. The controller 7 is operation means for operating an operation target (an object displayed on the display screen of the monitor 2). The controller 7 includes an operation section having a plurality of operation buttons. As described later in detail, the controller 7 also includes an acceleration sensor 37 (described later) for detecting an acceleration in at least two axial directions perpendicular to each other. Data representing an acceleration detected by the acceleration sensor 37 is transmitted to the game apparatus 3 as a part of the operation data. The game apparatus 3 performs a predetermined calculation on data representing the acceleration to calculate an inclination of the controller 7 and executes processing in accordance with the inclination when necessary. The controller 7 further includes an imaging information calculation section 35 (described later) for taking an image seen from the controller 7. The imaging information calculation section 35 takes an image of each of the markers 8a and 8b located in the vicinity of the monitor 2. The game apparatus 3 executes processing in accordance with the position and the posture of the controller 7 by calculation processing based on the image.

Figure 2:
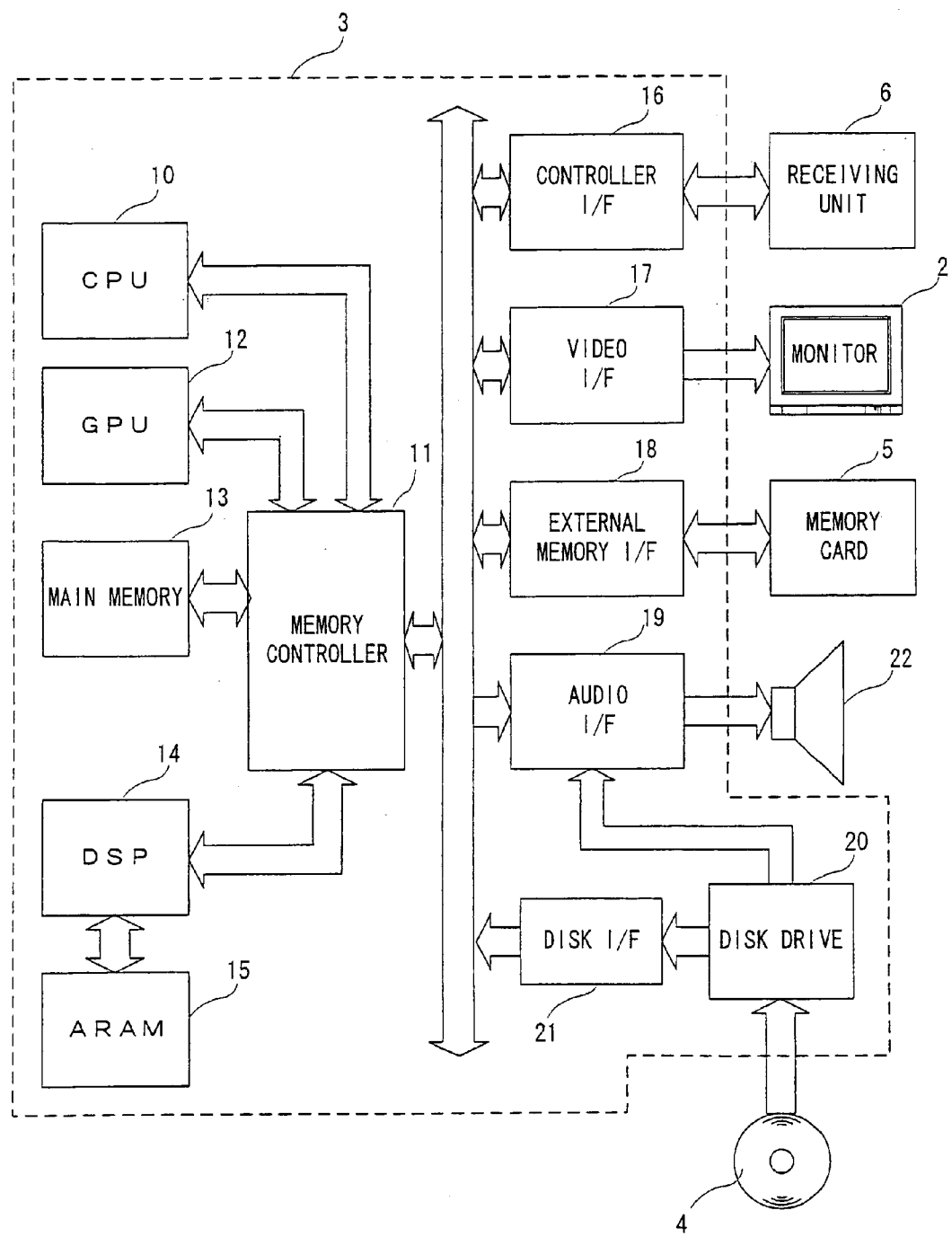
FIG. 2 is a functional block diagram of the game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a start program stored in a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a controller I/F (interface) 16, a video I/F 17, an external memory I/F 18, an audio I/F 19, and a disc I/F 21 via a predetermined bus. The controller I/F 16, the video I/F 17, the external memory I/F 18, the audio I/F 19 and the disc I/F 21 are respectively connected to the receiving unit 6, the monitor 2, the external memory card 5, a speaker 22 and a disc drive 20.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the display screen of the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored in the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored in the ARAM 15 and outputs the sound data to the speaker 22 included in the monitor 2 via the memory controller 11 and the audio I/F 19.

The memory controller 11 comprehensively controls data transfer, and is connected to the various I/Fs described above. The controller I/F 16 includes, for example, four controller I/Fs, and communicably connects the game apparatus 3 to an external device which is engageable via connectors of the controller I/Fs. For example, the receiving unit 6 is engaged with such a connector and is connected to the game apparatus 3 via the controller I/F 16. As described above, the receiving unit 6 receives the operation data from the controller 7 and outputs the operation data to the CPU 10 via the controller I/F 16. In other embodiments, the game apparatus 3 may include a receiving module for receiving the operation data transmitted from the controller 7, instead of the receiving unit 6. In this case, the operation data received by the receiving module is output to the CPU 10 via a predetermined bus. The video I/F 17 is connected to the monitor 2. The external memory I/F 18 is connected to the external memory card 5 and is accessible to a backup memory or the like provided in the external card 5. The audio I/F 19 is connected to the speaker 22 built in the monitor 2, and is connected such that the sound data read by the DSP 14 from the ARAM 15 or sound data directly output from the disc drive 20 is output from the speaker 22. The disc I/F 21 is connected to the disc drive 20. The disc drive 20 reads data stored at a predetermined reading position of the optical disc 4 and outputs the data to a bus of the game apparatus 3 or the audio I/F 19.

Figure 3A:
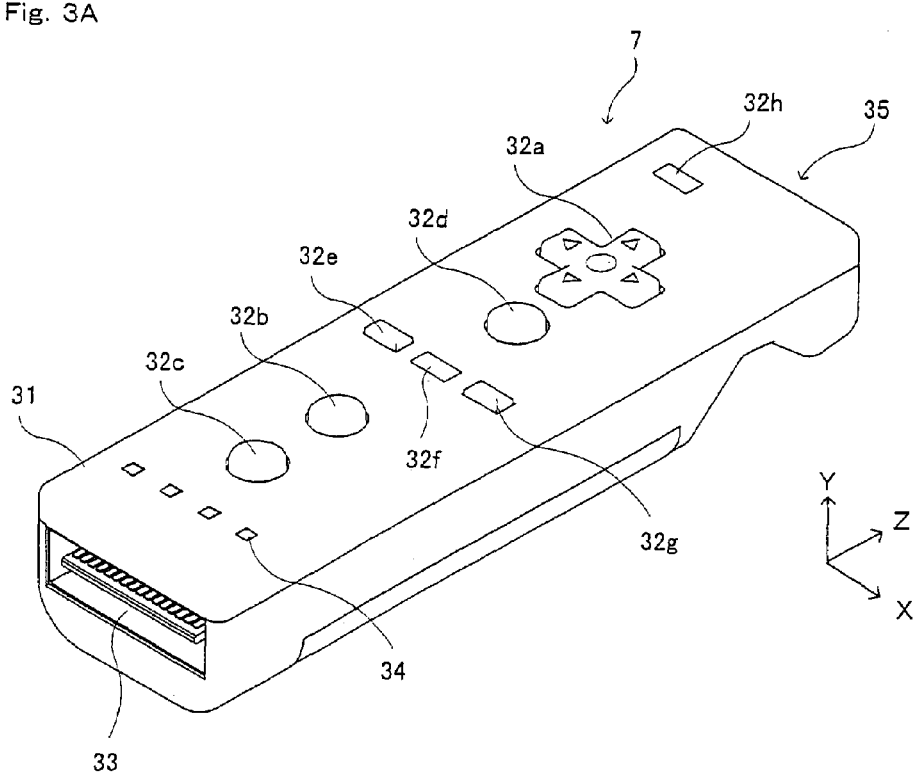
FIG. 3A is an isometric view of a controller 7.
Figure 3B:
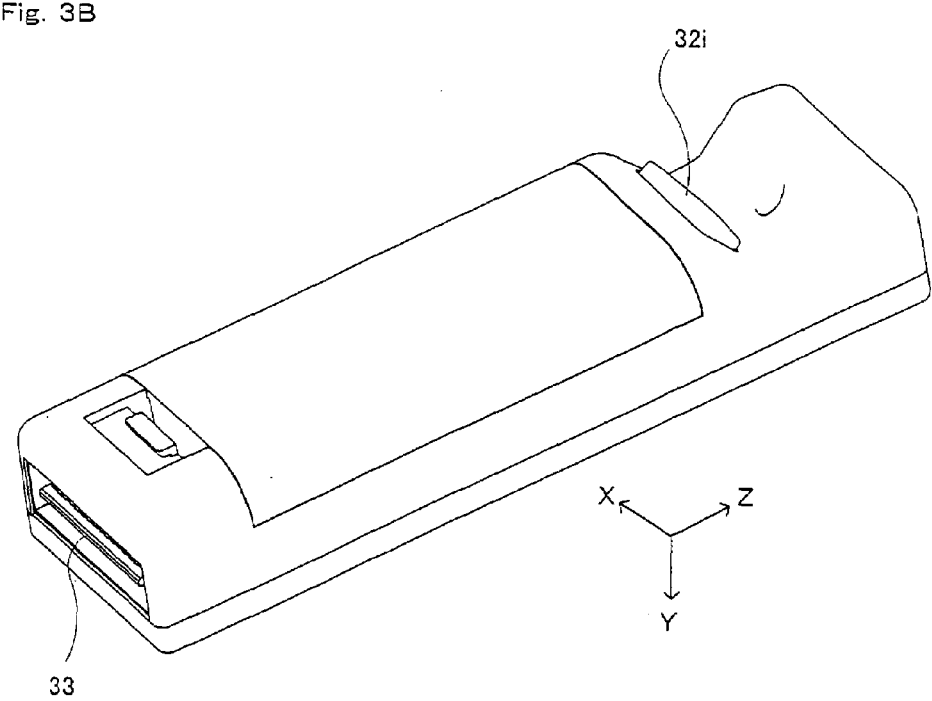
FIG. 3B is another isometric view of the controller 7.
Figure 4:
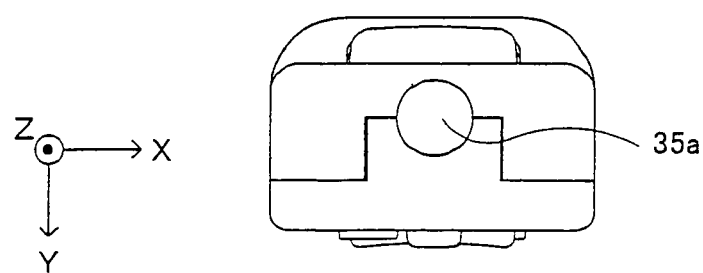
FIG. 4 is a front view of the controller 7.

With reference to FIG. 3A through FIG. 8, the controller 7 will be described. FIG. 3A through FIG. 5B are external isometric views of the controller 7. FIG. 3A is an isometric view of the controller 7 seen from the top rear side thereof. FIG. 3B is an isometric view of the controller 7 seen from the bottom rear side thereof. FIG. 4 is a front view of the controller 7.

As shown in FIG. 3A, FIG. 3B and FIG. 4, the controller 7 includes a housing 31 formed by plastic molding or the like. The housing 31 has a generally parallelepiped shape extending in a longitudinal or front-rear direction (the Z-axis direction shown in FIG. 3A). The overall size of the housing 31 is small enough to be held by one hand of an adult or even a child. The player can use the controller 7 to perform a game operation of pressing buttons provided thereon, a game operation of changing the inclination of the controller 7 itself (the angle of the controller 7 with respect to a direction of gravity), and a game operation of changing the position or direction of the controller 7 itself. For example, the player can change the inclination of the controller 7 to move an operation target (object) appearing in the game space. Also for example, the player can rotate the controller 7 with the longitudinal direction thereof as an axis to move the operation target through processing of the linear acceleration signals generated by the acceleration sensor 37. The player can change the position indicated by the controller 7 on the display screen to move the object appearing in the game space. The "position indicated by the controller 7 on the display screen" is ideally a position at which a phantom straight line extending from a front end of the controller 7 in the longitudinal direction crosses the display screen of the monitor 2. However, it is not necessary that the "position indicated by the controller 7 on the display screen" is strictly such a position. It is sufficient that the game apparatus 3 can calculate a position in the vicinity thereof. Hereinafter, a position indicated by the controller 7 on the display screen will be referred to as an "indicated position" or an "indicated position by the controller 7". The longitudinal direction of the controller 7 (housing 31) will be sometimes referred to as an "indicated direction".

The housing 31 has a plurality of operation buttons. Provided on a top surface of the housing 31 are a cross key 32*a*, an X button 32*b*, a Y button 32*c*, a B button 32*d*, a select switch 32*e*, a menu switch 32*f*, and a start switch 32*g*. On a bottom surface of the housing 31, a recessed portion is formed. On a rear slope surface of the recessed portion, an A button 32*i* is provided. These buttons and switches are assigned various functions in accordance with the game program executed by the game apparatus 3, but this will not be described in detail because the functions are not directly relevant to the present invention. On the top surface of the housing 31, a power switch 32*h* is provided for remotely turning on or off the game apparatus 3.

Figure 5A:
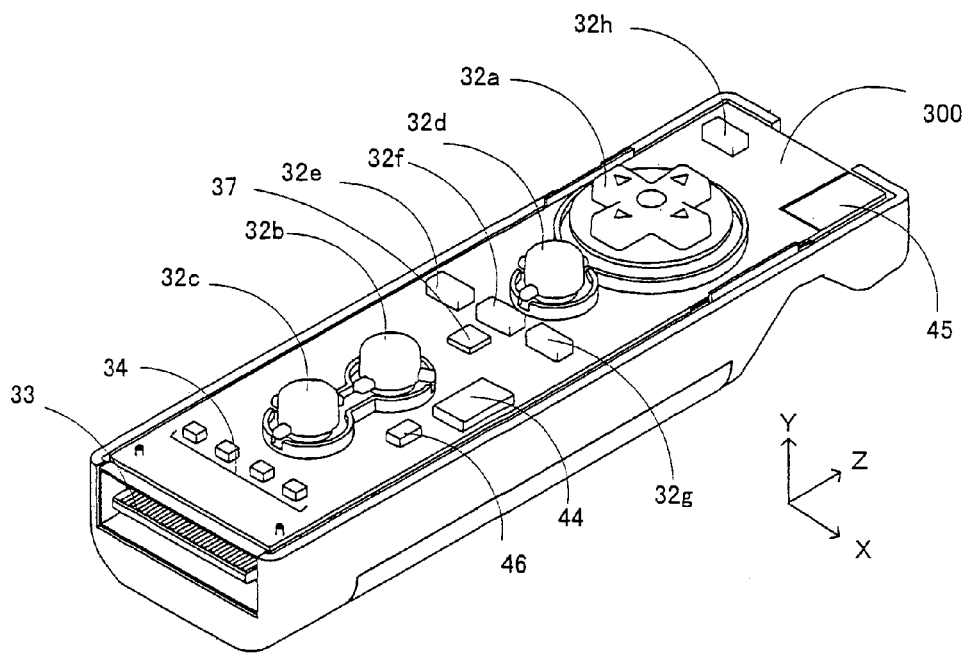
FIG. 5A is a view illustrating an internal structure of the controller 7.
Figure 5B:
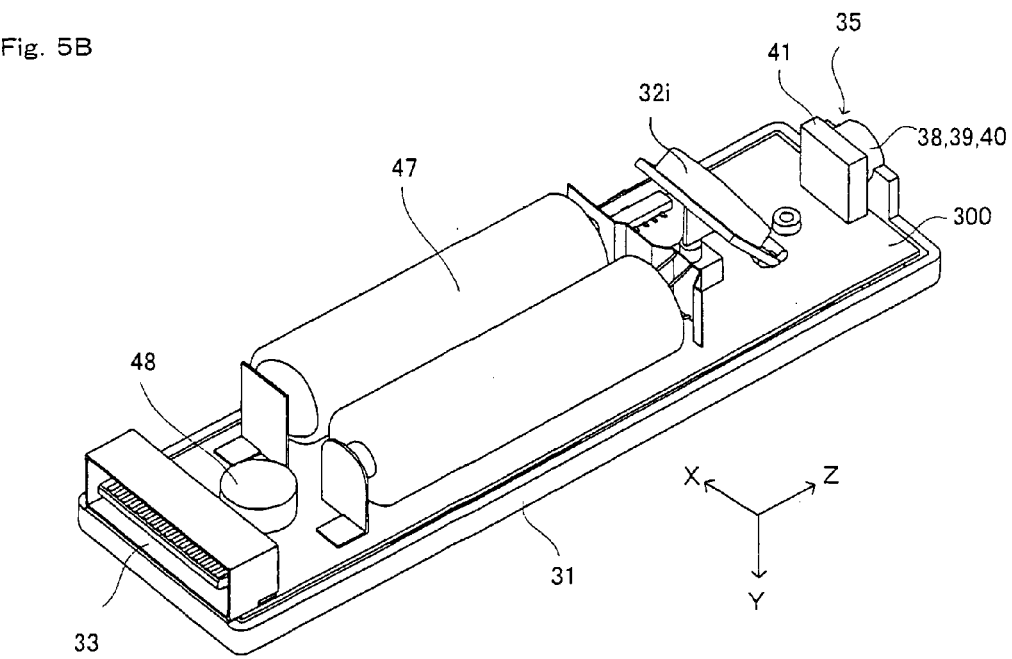
FIG. 5B is another view illustrating the internal structure of the controller 7.

The controller 7 has the imaging information calculation section 35 (FIG. 5B). As shown in FIG. 4, a light incident opening 35*a* of the imaging information calculation section 35 is provided on a front surface of the housing 31. On a rear surface of the housing 31, a connector 33 is provided. The connector 33 is, for example, a 32-pin edge connector, and is used for connecting the controller 7 to another device. In a rear part of the top surface of the housing 31, a plurality of LEDs 34 are provided. The controller 7 is assigned a controller type (number) so as to be distinguishable from the other controllers 7. The LEDs 34 are used for informing the player of the controller type which is currently set to controller 7 that he/she is using. Specifically, when the controller 7 transmits the operation data to the game apparatus 3, one of the plurality of LEDs 34 corresponding to the controller type is lit up.

Figure 6:
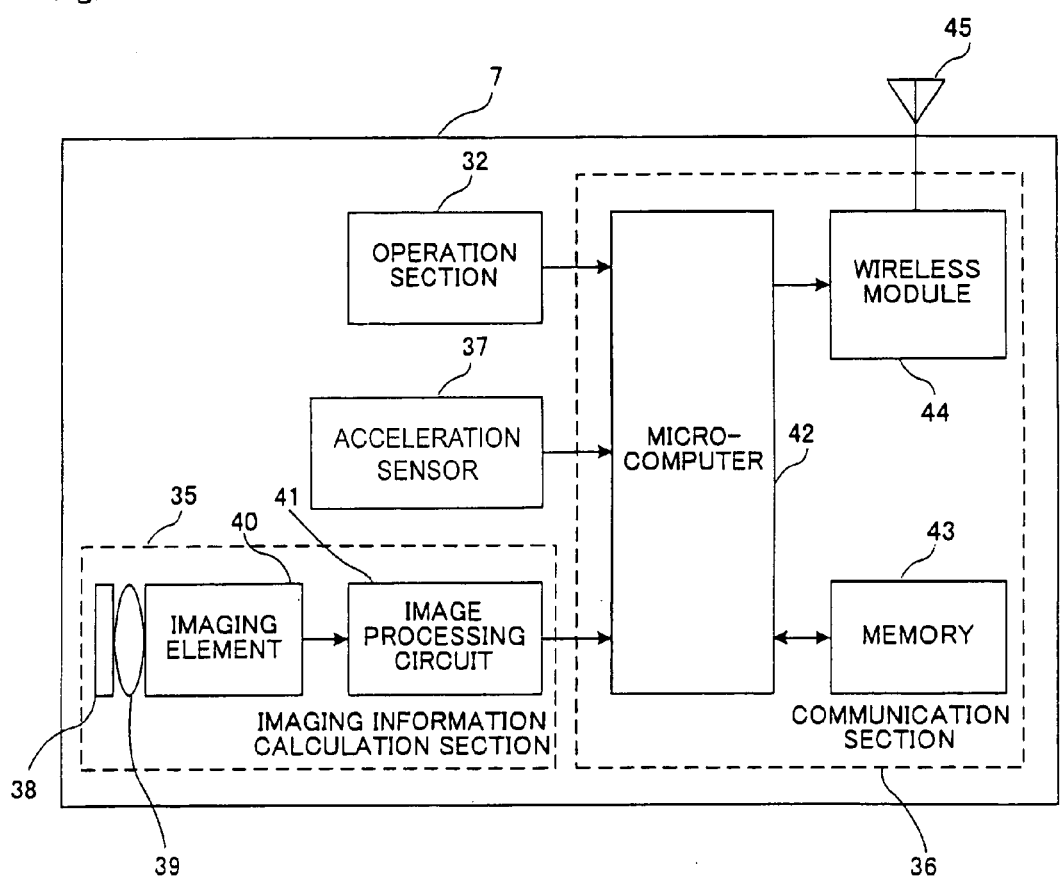
FIG. 6 is a block diagram illustrating a structure of the controller 7.

With reference to FIG. 5A, FIG. 5B and FIG. 6, an internal structure of the controller 7 will be described. FIG. 5A and FIG. 5B illustrate an internal structure of the controller 7. FIG. 5A is an isometric view illustrating a state where an upper casing (a part of the housing 31) of the controller 7 is removed. FIG. 5B is an isometric view illustrating a state where a lower casing (a part of the housing 31) of the controller 7 is removed. FIG. 5B shows a reverse side of a substrate 300 shown in FIG. 5A.

As shown in FIG. 5A, the substrate 300 is fixed inside the housing 31. On a top main surface of the substrate 300, the operation buttons 32*a* through 32*h*, the acceleration sensor 37, the LEDs 34, a quartz oscillator 46, a wireless module 44, an antenna 45 and the like are provided. These elements are connected to a microcomputer 42 (see FIG. 6) via lines (not shown) formed on the substrate 300 and the like. The wireless module 44 and the antenna 45 allow the controller 7 to act as a wireless controller. The quartz oscillator 46 generates a reference clock of the microcomputer 42 described later.

As shown in FIG. 5B, at a front edge of a bottom main surface of the substrate 300, the imaging information calculation section 35 is provided. The imaging information calculation section 35 includes an infrared filter 38, a lens 39, an imaging element 40 and an image processing circuit 41 located in this order from the front surface of the controller 7. These elements are attached to the bottom main surface of the substrate 300. At a rear edge of the bottom main surface of the substrate 300, the connector 33 is attached. The operation button 32*i* is attached on the bottom main surface of the substrate 300 rearward to the imaging information calculation section 35, and cells 47 are accommodated rearward to the operation button 32*i*. On the bottom main surface of the substrate 300 between the cells 47 and the connector 33, a vibrator 48 is attached. The vibrator 48 may be, for example, a vibration motor or a solenoid. The controller 7 is vibrated by an actuation of the vibrator 48, and the vibration is conveyed to the player holding the controller 7. Thus, a so-called vibration-responsive game is realized.

Figure 7:
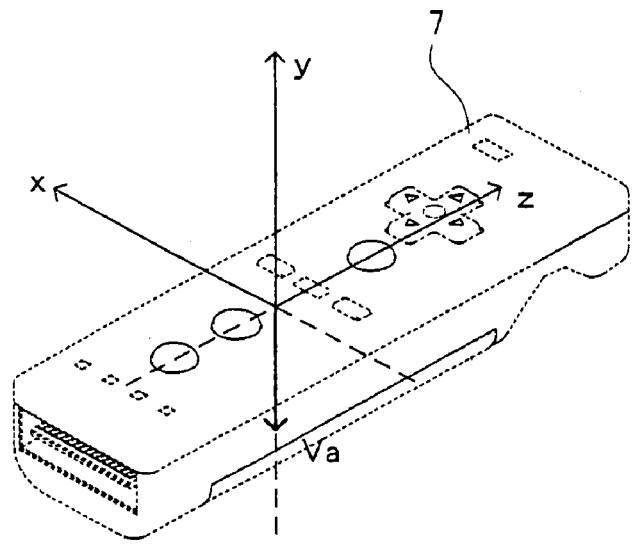
FIG. 7 is a view illustrating the relationship between the inclination of the controller 7 and the output from an acceleration sensor.
Figure 8:
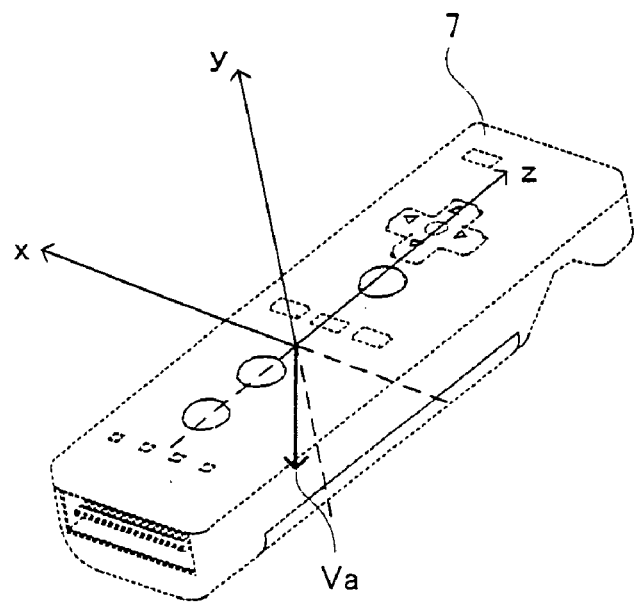
FIG. 8 is another view illustrating the relationship between the inclination of the controller 7 and the output from the acceleration sensor.

FIG. 6 is a block diagram showing the structure of the controller 7. The controller 7 includes the acceleration sensor 37 mentioned above. The acceleration sensor 37 detects an acceleration of the controller 7 (including an acceleration of gravity). Namely, the acceleration sensor 37 detects a force applied to the controller 7 (including gravity) and outputs the detected force as an acceleration. FIG. 7 and FIG. 8 show the relationship between the inclination of the controller 7 and the output of the acceleration sensor 37. As shown in FIG. 7 and FIG. 8, the acceleration sensor 37 detects an acceleration in each of three axial directions regarding the controller 7, i.e., the up-down direction (y-axis direction in FIG. 7), the left-right direction (x-axis direction in FIG. 7), and the front-rear direction (the z-axis direction in FIG. 7). Namely, the acceleration sensor 37 detects an acceleration in a linear direction along an axis, and therefore an output from the acceleration 37 represents an a value of an acceleration in each axis. Therefore, the detected acceleration is represented as a three-dimensional vector in an x-y-z coordinate system (see FIG. 7 and FIG. 8) which is set based on the controller 7. Herein, the upward direction regarding the controller 7 is set as a positive y-axis direction, the frontward direction regarding the controller 7 is set as a positive z-axis direction, and the leftward direction regarding the controller 7 in the case where the controller 7 is viewed from the rear end thereof toward the front end thereof is set as a positive x-axis direction.

As explained above, the controller 7 preferably includes a three-axis, linear acceleration sensor 37 that detects linear acceleration in each of the three axial directions described above. Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 37 may be of the type available from Analog Devices, Inc. or STMicroelectronics N.V. Preferably, the acceleration sensor 37 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 37.

As one skilled in the art understands, linear accelerometers, as used in acceleration sensor 37, are only capable of detecting acceleration along a straight line corresponding to each axis of the acceleration sensor. In other words, the direct output of the acceleration sensor 37 is limited to signals indicative of linear acceleration (static or dynamic) along each of the two or three axes thereof. As a result, the acceleration sensor 37 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 37, additional information relating to the controller 7 can be inferred or calculated, as one skilled in the art will readily understand from the description herein. For example, by detecting static, linear acceleration (i.e., gravity), the linear acceleration output of the acceleration sensor 37 can be used to infer or calculate tilt or inclination of the object relative to the gravity vector by correlating tilt angles with detected linear acceleration. In this way, the acceleration sensor 37 can be used in combination with the micro-computer 42 (or another processor) to determine tilt, attitude or position of the controller 7. Similarly, various movements and/or positions of the controller 7 can be calculated or inferred through processing of the linear acceleration signals generated by the acceleration sensor 37 when the controller 7 containing the acceleration sensor 37 is subjected to dynamic accelerations by, for example, the hand of a user. In another embodiment, the acceleration sensor 37 may include an embedded signal processor or other type of dedicated processor for performing any desired processing of the acceleration signals output from the accelerometers therein prior to outputting signals to micro-computer 42. For example, the embedded or dedicated processor could convert the detected acceleration signal to a corresponding tilt angle when the acceleration sensor is intended to detect static acceleration (i.e., gravity).

FIG. 7 shows a state where an acceleration of gravity (vector Va in FIG. 7) is directed downward regarding the controller 7. In this state, the value Va of an acceleration detected by the acceleration sensor 37 (hereinafter, referred to as an "acceleration vector") is in a negative y-axis direction. In FIG. 7 and FIG. 8, it is assumed that the controller 7 is in a still state. In the state shown in FIG. 7, only the y coordinate value of the acceleration vector Va is not zero, and both the x coordinate value and the z coordinate value of the acceleration vector Va are zero. FIG. 8 shows a state in which the controller 7 is inclined as a result of being rotated from the state shown in FIG. 7 around the z axis. In the state shown in FIG. 8, the direction of the acceleration vector Va is changed from the state in FIG. 7. The x coordinate value and the y coordinate value of the acceleration vector Va are not zero, and the z coordinate value of the acceleration vector Va is zero because the controller 7 has been rotated around the z axis. As shown in FIG. 7 and FIG. 8, the acceleration sensor 37 can detect a value of an acceleration having three axial directions regarding the controller 7 as components. Thus, a calculation handling the value of the acceleration as an acceleration vector having the three axial components is performed by software processing using a computer such as the micro-computer 42 or the CPU 10, and thus an inclination of the controller 7 can be calculated. Data representing the acceleration detected by the acceleration sensor 37 (acceleration data) is output to the communication section 36. In the first embodiment, the acceleration sensor 37 outputs a value in accordance with the acceleration sequentially (specifically, frame by frame). The game apparatus 3 performs a predetermined calculation handling the value as an acceleration vector to calculate the inclination (posture) of the controller 7, and executes game processing in accordance with the inclination.

In this embodiment, the magnitude of an acceleration which is detected when the controller 7 is in a still state, i.e., the magnitude of an acceleration which represents only an acceleration of gravity, is set as 1. For example, the values of the components of the acceleration vector Va detected in the state shown in FIG. 7 are (0, 1, 0).

In the first embodiment, it is intended to calculate an inclination of the controller 7 in the x-y directions. Therefore, in the first embodiment, an acceleration sensor for detecting an acceleration in only two axial directions (x-y directions) may be used instead of the acceleration sensor 37 for detecting an acceleration in three axial directions. The acceleration sensor 37 is typically of a static capacitance type, but may be of any other system.

The controller 7 includes the operation section 32 (operation buttons), the imaging information calculation section 35, and the communication section 36 in addition to the acceleration sensor 37. In this embodiment, the controller 7 only needs to include acceleration detection means (the acceleration sensor 37) and may not absolutely need to include the operation section 32 or the imaging information calculation section 35.

Returning to FIG. 6, the imaging information calculation section 35 is a system for analyzing image data taken by imaging means and detecting the position of the center of gravity, the size and the like of an area having a high brightness in the image data. The imaging information calculation section 35 has, for example, a maximum sampling period of about 200 frames/sec., and therefore can trace and analyze even a relatively fast motion of the controller 7.

Specifically, the imaging information calculation section 35 includes the infrared filter 38, the lens 39, the imaging element 40 and the image processing circuit 41. The infrared filter 38 allows only infrared light to pass therethrough, among light incident on the front surface of the controller 7. The markers 8a and 8b located in the vicinity of the display screen of the monitor 2 are infrared LEDs for outputting infrared light forward from the monitor 2. Therefore, the provision of the infrared filter 38 allows the image of each of the markers 8a and 8b to be taken more accurately. The lens 39 collects the infrared light which has passed through the infrared filter 38 and outputs the infrared light to the imaging element 40. The imaging element 40 is a solid-state imaging device such as, for example, a CMOS sensor or a CCD. The imaging element 40 takes an image of the infrared light collected by the lens 39. Accordingly, the imaging element 40 takes an image of only the infrared light which has passed through the infrared filter 38 and generates image data. Hereinafter, an image taken by the imaging element 40 will be referred to as a "taken image". The image data generated by the imaging element 40 is processed by the image processing circuit 41. The image processing circuit 41 calculates the positions of the imaging targets (the markers 8a and 8b) in the taken image. The positions are represented in a coordinate system (x'-y' coordinate system) in which the downward direction of the taken image is a positive y'-axis direction and the rightward direction of the taken image is a positive x'-axis direction. The image processing circuit 41 outputs coordinate values indicating the respective positions of the markers 8a and 8b in the taken image to the communication section 36 as imaging data. Since these coordinate values vary in accordance with the direction or position of the controller 7 itself, the game apparatus 3 can calculate the direction and position of the controller 7 using these coordinate values.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32, the acceleration sensor 37 and the imaging information calculation section 35 to the microcomputer 42 is temporarily stored in the memory 43. The wireless transmission from the communication section 36 to the receiving unit 6 is performed at a predetermined time interval. Since game processing is generally performed at a cycle of 1/60 sec., the wireless transmission needs to be performed at a cycle of a shorter time period. At the transmission timing to the receiving unit 6, the microcomputer 42 outputs the data stored in the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 7. The very weak electric signal is received by the receiving unit 6 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

The shape of the controller 7, and the shape, number, position or the like of the operation buttons and switches shown in FIG. 3A through FIG. 5B are merely exemplary, and may be altered without departing from the scope of the present invention. The position of the imaging information calculation section 35 in the controller 7 (the light incident opening 35a of the imaging information calculation section 35) does not need to be on the front surface of the housing 31, and may be on another surface as long as light can enter from the outside of the housing 31. In this case, the "indicated direction" is a direction vertical to the light incident opening, i.e., the direction in which the imaging element 40 takes images of the imaging targets.

By using the controller 7, the player can perform a game operation of changing the inclination of the controller 7, of changing the position of the controller 7 itself, or of rotating the controller 7, in addition to the conventional game operation of pressing the operation buttons or switches. Hereinafter, the game operations using the controller 7 will be described.

Figure 9:
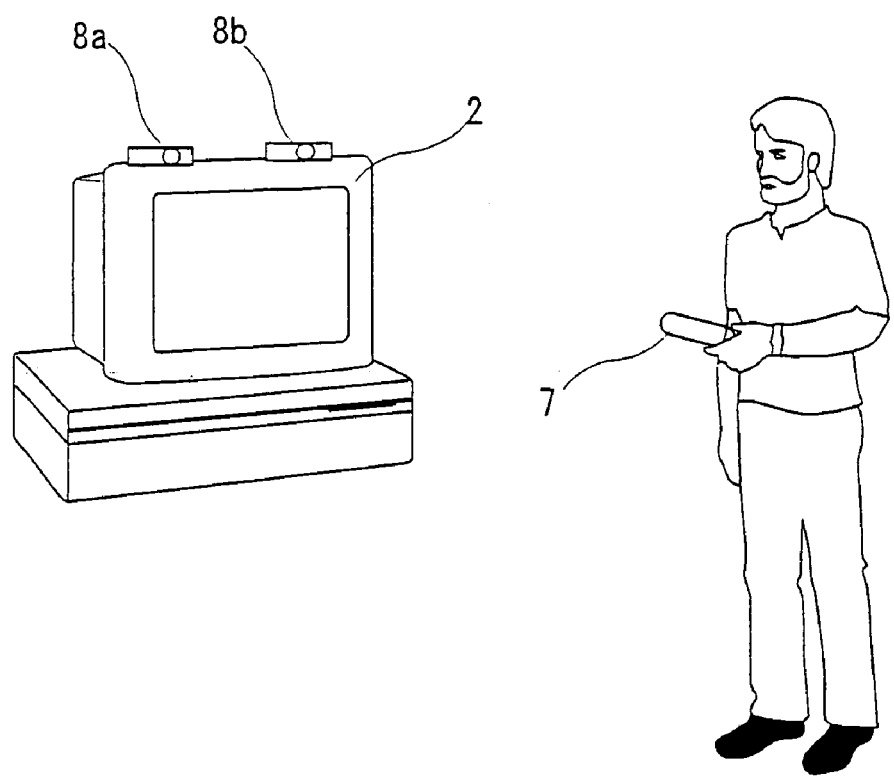
FIG. 9 shows a general view of a game operation using the controller 7.

FIG. 9 is a general view of a game operation using the controller 7. As shown in FIG. 9, when playing the game using the controller 7 with the game system 1, the player holds the controller 7 with one hand. The markers 8a and 8b are located parallel to the transverse or width direction of the monitor 2. The player holds the controller 7 such that the front surface of the controller 7 (having the light incident opening 35a by which the imaging information calculation section 35 takes the image of each of the markers 8a and 8b) faces the markers 8a and 8b. In this state, the player performs a game operation of changing the inclination of the controller 7, of changing the position indicated by the controller 7 on the display screen (indicated position), or of changing the distance between the controller 7 and the markers 8a and 8b.

Next, processing of calculating an inclination of the controller 7 using an output from the acceleration sensor 37 will be described. In a still state of controller 7, the acceleration vector which is output from the acceleration sensor 37 is directed in the direction of the acceleration of gravity (see FIG. 7 and FIG. 8). Therefore, the angle of the controller 7 with respect to the direction of the acceleration of gravity, i.e., the inclination of the controller 7, can be represented as a difference between the direction of the acceleration vector and the negative y-axis direction. Namely, in a still state of the controller 7, the value of the acceleration vector itself can be used as the inclination of the controller 7. In a state where the controller 7 is moving or rotating, the acceleration vector does not match the direction of the acceleration of gravity. Therefore, the value of the acceleration vector itself cannot be used as the inclination of the controller 7. In this embodiment, the acceleration is sequentially detected by the acceleration sensor 37, and also the inclination of the controller 7 is sequentially calculated. The inclination of the controller 7 at the current time is calculated using the output from the acceleration sensor 37 detected at the current time and the inclination of the controller 7 calculated at the previous time.

Figure 10:
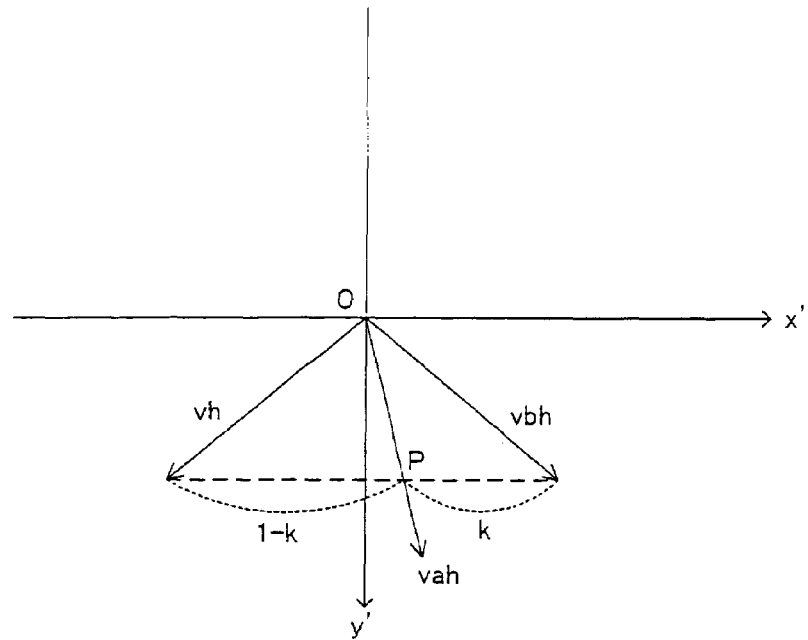
FIG. 10 illustrates an inclination calculation processing.

First with reference to FIG. 10, an overview of inclination calculation processing will be described. In the first embodiment, an inclination of the controller 7 regarding the rotation around the z axis will be calculated. FIG. 10 illustrates the inclination calculation processing. The inclination calculation processing is executed as follows. The game apparatus 3 first calculates a preliminary vector vh from the acceleration vector Va detected by the acceleration sensor 37. The preliminary vector vh indicates an inclination of the controller 7 represented by the acceleration vector itself. Specifically, the preliminary vector vh is obtained by extracting an x-axis component and a y-axis component of the acceleration vector Va and performing predetermined coordinate set conversion on the extracted two-dimensional vector. The preliminary vector vh is represented in the x'-y' coordinate system shown in FIG. 10, and has the origin of the x'-y' coordinate system as a start point. The preliminary vector vh is a unit vector having a length of 1. The preliminary vector vh is uniquely determined from the acceleration vector. The preliminary vector vh represents an inclination of the controller 7 under an assumption that the acceleration vector represents the acceleration of gravity (an assumption that the acceleration vector is directed in the direction of the acceleration of gravity).

The reason why only the x-axis component and the y-axis component of the acceleration vector Va are extracted is as follows. In the first embodiment, it is intended to calculate an inclination of the controller 7 regarding the rotation around the z axis (in the x-y directions), and therefore a z-axis component is not necessary. The reason why predetermined coordinate set conversion is performed on the extracted two-dimensional vector is that in the first embodiment, an inclination of the controller 7 is represented in a coordinate system different from the x-y-z coordinate system (represented in the x'-y' coordinate system shown in FIG. 10). In the x'-y" coordinate system, the positive x'-axis direction corresponds to the negative y-axis direction of the x-y-z coordinate system, and the positive y-axis direction corresponds to the negative x-axis direction of the x-y-z coordinate system. The x'-y' coordinate system is for representing positions of the imaging targets (the markers 8a and 8b) in a taken image which are calculated by the imaging information calculation section 35. By using the same coordinate system to process the inclination of the controller 7 calculated from the output of the acceleration sensor 37 and the positions of the imaging targets obtained from the imaging information calculation section 35, processing of reflecting both the inclination and the positions on the game operation is facilitated. In other embodiments, it is not absolutely necessary to use the images of the markers 8a and 8b for the game operation, in which case the above-mentioned coordinate set conversion is not necessary.

After calculating the preliminary vector vh, the game apparatus 3 calculates an inclination vector vah (see FIG. 10) based on the preliminary vector vh and a previous vector vbh. The inclination vector represents an inclination of the controller 7 to be calculated and is used for the game operation. The previous vector vbh is an inclination vector calculated previously. In this specification, the term "previous" means "immediately previous". In the case where, for example, the game apparatus 3 calculates an inclination vector frame by frame, the previous vector vbh is an inclination vector calculated one frame before. Like the preliminary vector vh, the inclination vector vah and the previous vector vbh are both a unit vector having a length of 1, and have the origin of the x'-y' coordinate system as a start point.

As shown in FIG. 10, the inclination vector vah is obtained by making the direction of the previous vector vbh closer to the direction of the preliminary vector vh at a predetermined degree. In the following description, the predetermined degree will be represented as an effectiveness k ($0 \leq k \leq 1$). Specifically, the inclination vector vah is directed from the origin toward point P and has a length of 1. Point P divides a line segment connecting the end point of the previous vector vbh and the end point of the preliminary vector vh at a ratio of k:(1−k). In the first embodiment, the effectiveness k is calculated based on the length of the preliminary vector vh. A method for calculating the effectiveness k will be described in detail later.

Figure 11:
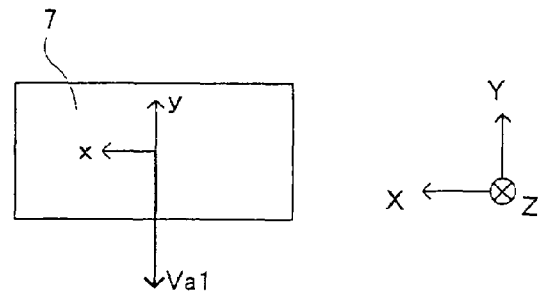
FIG. 11 shows the controller 7 in a still state.
Figure 12:
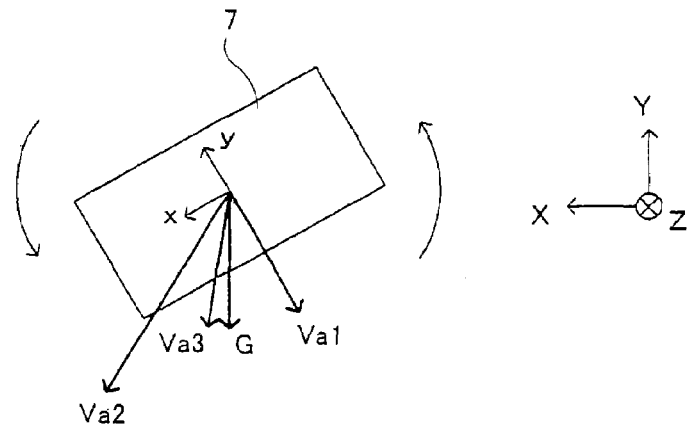
FIG. 12 shows the controller 7 in the middle of being rotated counterclockwise from the state shown in FIG. 11.

In the state where the controller 7 is being moved or rotated by the operation of the player, acceleration components other than the acceleration of gravity are detected. Therefore, the acceleration vector itself cannot be regarded as the inclination of the controller 7. An inclination of the controller 7 calculated only based on the acceleration vector is not accurate. With reference to FIG. 11 and FIG. 12, this will be described.

FIG. 11 shows the controller 7 in a still state. FIG. 11 and FIG. 12 shows the controller 1 seen from the rear end thereof. In the state shown in FIG. 11, the direction of an acceleration vector Va1 detected by the acceleration sensor 37 matches a direction G of an acceleration of gravity. Therefore, the acceleration vector Va1 itself can be regarded as the inclination of the controller 7. The inclination thus calculated is accurate. FIG. 12 shows the controller 7 in the middle of being rotated counterclockwise from the state in FIG. 11. In the state shown in FIG. 12, an acceleration vector Va2 which is offset clockwise (in the opposite direction to the moving direction of the controller 7) from the direction G of the actual acceleration of gravity is detected. As shown in FIG. 12, the direction of the acceleration vector changes more drastically than the inclination of the controller 7. The length of the acceleration vector Va2 is different from the length of the acceleration vector Va1 which matches the acceleration of gravity (in the example of FIG. 12, the acceleration vector Va2 is longer than the acceleration vector Va1). (It is considered that such changes are caused by, for example, a centrifugal force or an influence of an acceleration by the destabilization of the hand of the like). An inclination of the controller 7 calculated only based on the acceleration vector Va2 is not accurate. As described above, in the state of the controller 7 in the middle of being moved or rotated by the player, the inclination of the controller 7 cannot be accurately calculated because the acceleration detected by the acceleration sensor 37 often includes components other than the acceleration of gravity. It may be possible to wait until the controller 7 gets still and calculate the inclination thereof using an acceleration vector obtained after the controller 7 gets still. This method, however, cannot calculate an inclination of the controller 7 in real time and thus cannot be easily applied to a game apparatus or the like which requires a quick responsiveness for operations thereof.

According to the first embodiment, the current inclination of the controller 7 is calculated using the direction of the current acceleration vector (the direction of the preliminary vector) and also the direction of the previous inclination vector (see FIG. 10), instead of in the direction of the current acceleration vector as the inclination of the controller 7. With this method, even when the direction of the acceleration vector rapidly changes from the direction of the previous acceleration vector, the inclination vector is calculated such that the direction thereof is changed more slowly than the direction of the acceleration vector. In the example of FIG. 12, the direction of the inclination vector is between the direction of the previous acceleration vector Va1 and the preliminary vector Va2 (for example, the inclination vector is a vector Va3). With this method, an inclination vector representing an inclination closer to an accurate inclination (i.e., closer to the actual instantaneous inclination) of the controller 7 can be obtained as compared to the case where the direction of the acceleration vector itself (i.e., as currently detected) is used as the inclination of the controller 7. According to the first embodiment, the inclination of the controller 7 can be calculated more accurately.

According to the first embodiment, information used for calculating the inclination vector is the current acceleration vector and the previous inclination vector (i.e., the previous vector). Thus, according to the first embodiment, the inclination of the controller 7 can be calculated using only the information owned by the game apparatus 3 at the time when the acceleration sensor 37 obtains the acceleration vector. Therefore, the inclination of the controller 7 can be calculated in real time.

Figure 13:
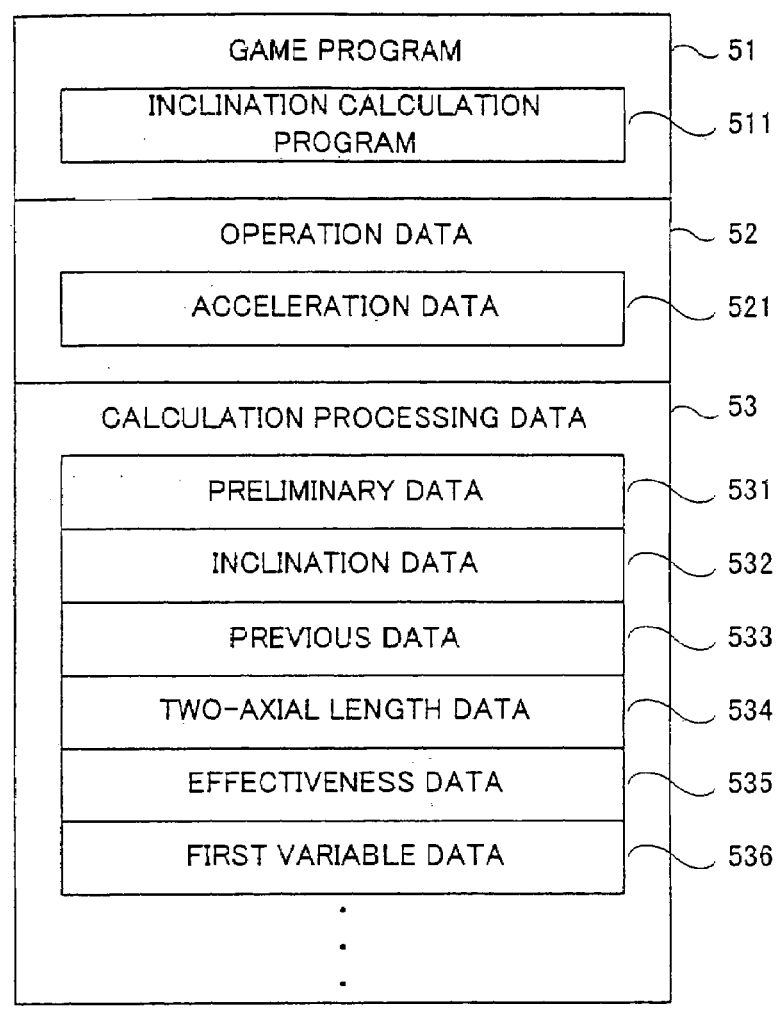
FIG. 13 shows main data stored on a main memory of the game apparatus in a first non-limiting example implementation.

Next, game processing executed by the game apparatus 3 will be described in detail. First, main data used for the game processing will be described with reference to FIG. 13. FIG. 13 shows main data stored on the main memory 13 of the game apparatus 3. As shown in FIG. 13, the main memory 13 has stored thereon a game program 51, operation data 52, calculation processing data 53 and the like. In addition to the above-mentioned data, the main memory 13 has stored thereon image data of characters appearing in the game, data representing various parameters of the characters, and other data necessary for the game processing.

The game program 51 is partially or entirely read from the optical disc 4 at an appropriate time after the game apparatus 3 is powered on and stored on the main memory 13. The game program 51 includes an inclination calculation program 511. The inclination calculation program 511 is a program for executing the processing of calculating an inclination of the controller 7 (the inclination calculation processing) using an output from the acceleration sensor 37. The game program 51 includes programs necessary for the game processing in addition to the inclination calculation program 511.

The operation data 52 is transmitted from the controller 7 to the game apparatus 3 and stored on the main memory 13. The operation data 52 includes acceleration data 521. The acceleration data 521 represents an acceleration vector Va detected by the acceleration sensor 37. Herein, the acceleration data 521 represents an acceleration in each of three axial directions (x-y-z directions) shown in FIG. 7. In addition to the acceleration data 521, the operation data 52 includes data representing positions of the imaging targets (the markers 8a and 8b) in a taken image and data representing operations performed on the buttons and switches of the operation section 32.

The calculation processing data 53 is used for the inclination calculation processing. The calculation processing data 53 includes preliminary data 531, inclination data 532, previous data 533, two-axial length data 534, effectiveness data 535, and first variable data 536.

The preliminary data 531 represents a preliminary vector vh mentioned above. More specifically, the preliminary data 531 represents an inclination uniquely determined from the acceleration data 521, i.e., an inclination of the controller 7 calculated under an assumption that the acceleration data 521 represents an acceleration of gravity. The inclination data 532 represents an inclination vector vah. The inclination data 532 is basically calculated frame by frame, but may not be calculated when the acceleration vector Va represented by the acceleration data 521 fulfills a condition described later (step S12). The previous data 533 represents a previous vector vbh. When the inclination data 532 is newly calculated (i.e., updated) and thus the main memory 13 is updated, the newly calculated inclination data is also stored on the main memory 13 as updated "previous data" 533 to be used in the next frame for calculating an inclination vector.

The two-axial length data 534 represents a length L1 of the acceleration vector Va represented by the acceleration data 521 in two axial directions (x-y directions) (i.e., the length of a vector having an x component and a y component of the acceleration vector Va). The length L1 is used for, for example, calculating an effectiveness k. The effectiveness data 535 represents an effectiveness k, which indicates a degree at which the previous vector vbh is made closer to the preliminary vector vh. As described later in more detail, the effectiveness k is a variable representing a degree at which the acceleration of gravity contributes to the data of the acceleration vector (a degree at which the acceleration vector is directed in the direction of the acceleration of gravity).

The first variable data 536 represents a first variable d1 which indicates, in the case where the magnitude of the acceleration of gravity detected by the acceleration sensor 37 is 1, how close to 1 the length L1 of the acceleration vector is. The first variable d1 is used for calculating the effectiveness k.

Figure 14:
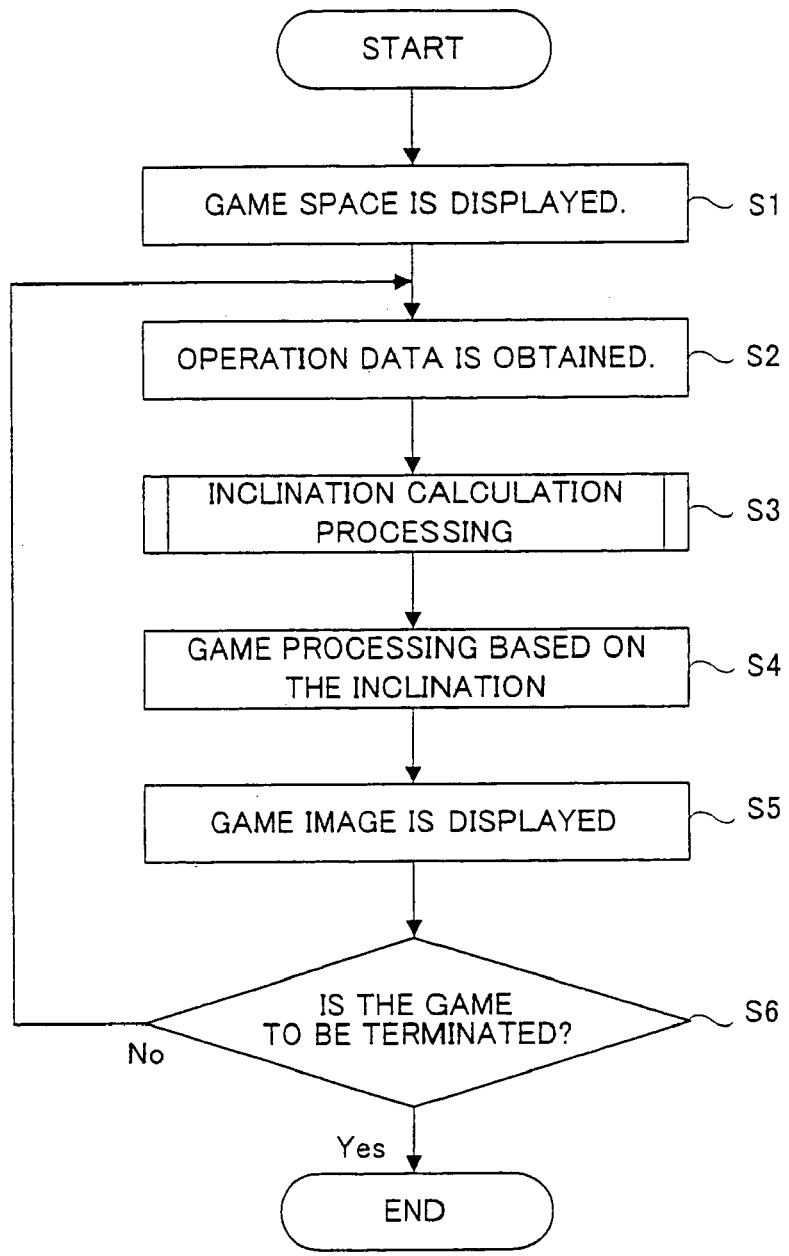
FIG. 14 is a flowchart illustrating game processing executed by the game apparatus 3.

Next, the game processing executed by the game apparatus 3 will be described in detail with reference to FIG. 14 and FIG. 15. FIG. 14 is a flowchart illustrating a flow of the game processing executed by the game apparatus 3. When the game apparatus 3 is turned on, the CPU 10 of the game apparatus 3 executes a start program stored on the boot ROM (not shown) to initialize each unit such as the main memory 13. The game program stored on the optical disc 4 is read into the main memory 13, and the CPU 10 starts the execution of the game program. The flowchart shown in FIG. 14 illustrates the game processing after the above-described processing is completed. With reference to FIG. 14, the game processing for calculating an inclination of the controller 7 from an acceleration detected by the acceleration sensor 37 will be explained in detail, and other game processing not directly relevant to the present invention will be omitted.

First in step S1, a game space is constructed and displayed on the monitor 2. The CPU 10 constructs, for example, a three-dimensional game space (or a two-dimensional game space) and locates objects appearing in the game space at predetermined initial positions. A game image representing the game space thus constructed is generated and displayed on the monitor 2. After this, the processing loop of steps S2 through S6 is repeated frame by frame, and thus the game proceeds.

In step S2, the CPU 10 obtains operation data from the controller 7. More specifically, the controller 7 transmits the operation data to the game apparatus 3 at a predetermined time interval (for example, frame by frame), and the CPU 10 stores the transmitted operation data on the main memory 13. The operation data includes the acceleration data.

Next in step S3, the CPU 10 executes the inclination calculation program 511 to execute the inclination calculation processing. In the inclination calculation processing, an inclination of the controller 7 is calculated based on the acceleration data 521 included in the operation data 52 stored on the main memory 13 in step S2. Hereinafter, with reference to FIG. 15, the inclination calculation processing will be described in detail.

Figure 15:
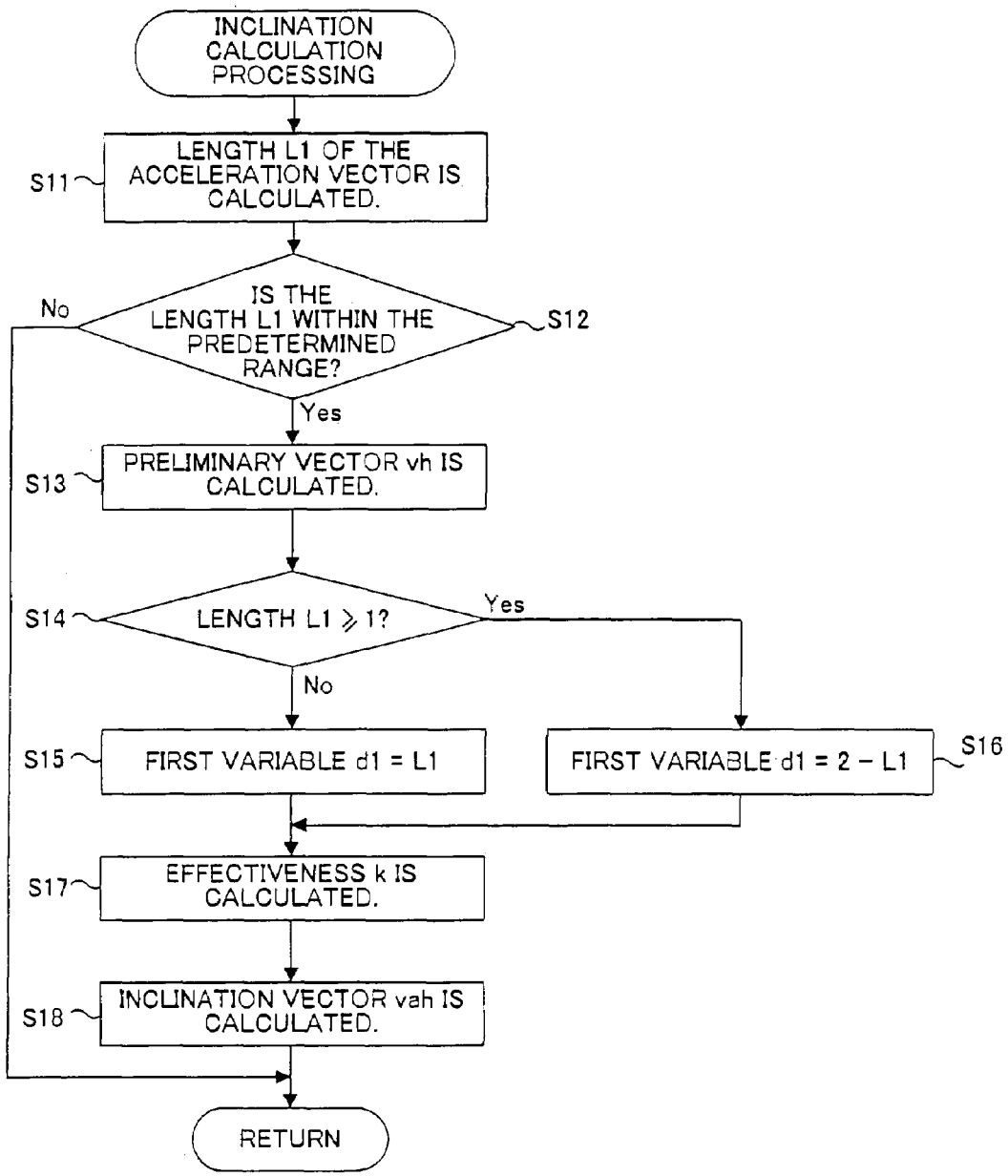
FIG. 15 is a flowchart illustrating a detailed flow of inclination computation processing in step S3 shown in FIG. 14 in the first example implementation.

FIG. 15 is a flowchart illustrating a detailed flow of the inclination calculation processing in step S3 shown in FIG. 14. The inclination calculation processing is executed as follows. First in step S11, a length L1 regarding x and y components of the acceleration data Va is calculated. When the acceleration vector Va is (ax, ay, az), the length L1 is calculated in accordance with the following expression.

$$L1=(ax^2+ay^2)^{1/2}$$

The CPU 10 stores data representing the calculated length L1 on the main memory 13 as the two-axial length data 534.

Next in step S12, it is determined whether or not the length L1 calculated in step S11 is within a predetermined range. The predetermined range is determined in advance, and is 0<L1≦2 in this non-limiting example implementation. When it is determined in step S12 that the length L1 is within the predetermined range, processing in step S13 is executed. When it is determined in step S12 that the length L1 is not within the predetermined range, processing in steps S13 through S18 is skipped and the CPU 10 terminates the inclination calculation processing. Namely, when the result of the determination in step S12 is negative, the inclination of the controller 7 is not calculated.

The processing in step S12 is executed in order to prevent an inclination of the controller 7 from being calculated when the length L1 calculated in step S1 is not encompassed in a predetermined range (in this embodiment, 0<L1≦2) around the magnitude of the acceleration of gravity. It is considered that the length L1 is not encompassed in the predetermined range when the acceleration detected by the acceleration sensor 37 includes many component other than the acceleration of gravity as a result of the controller 7 being violently moved by the player or the like. In such a case, it is difficult to obtain an accurate inclination of the controller 7 from the output of the acceleration sensor 37. Therefore, in this embodiment, an inaccurate inclination is prevented from being obtained in such a case by executing the determination processing in step S12.

In step S13, a preliminary vector vh is calculated. The preliminary vector vh can be calculated from the acceleration vector Va. The CPU 10 refers to the acceleration data 521 and the two-axial length data 534 stored on the main memory 13 to calculate components (hx, hy) of the preliminary vector vh in accordance with the following expressions.

$$hx=-ay/L1$$

$$hy=-ax/L1$$

In the above expressions, ax is a value of the x component of the acceleration vector Va, and ay is a value of the y component of the acceleration vector Va. The reason why −ay is used for calculating hx and −ax is used for calculating hy in the above expressions is that coordinate set conversion from the coordinate system of the acceleration vector (x-y-z coordinate system) into the coordinate system of the preliminary vector (x'-y' coordinate system) is to be performed. The reason why −ay and −ax are each divided by the length L1 is that the length of the preliminary length is to be 1. The CPU 10 stores data representing the calculated preliminary vector vh (=(hx, hy)) on the main memory 13 as the preliminary data 531.

By a series of processing in steps S14 through S16, a first variable d1 is calculated based on the length L1. In the series of processing, the first variable d1 is calculated such that the value of the first variable d1 is greater within the range of 0≦d1≦1 as the length L1 is closer to 1. First in step S14, it is determined whether or not the length L1 is less than 1. The CPU 10 can find the value of the length L1 by referring to the two-axial length data 534 stored on the main memory 13. When it is determined in step S14 that the length L1 is less than 1, processing in step S15 is executed. When it is determined in step S14 that the length L1 is equal to or greater than 1, processing in step S16 is executed.

In step S15, the value of the length L1 is set as the value of the first variable d1. In step S16, the first variable d1 is calculated in accordance with the following expression.

$$d1=2-L1$$

Namely, the first variable d1 is represented as a closeness of the length L1 to 1. Data representing the first variable d1 obtained in step S15 or S16 is stored on the main memory 13 as the first variable data 536. After step S15 or S16, processing in step S17 is executed.

In step S17, an effectiveness k is calculated based on the first variable d1. As described above, the effectiveness k is a variable representing a degree at which the direction of the previous vector vbh is made closer to the direction of the preliminary vector vh for calculating an inclination vector vah. Specifically, the CPU 10 calculates the effectiveness k in accordance with the following expression.

$$k=d1^2 \times A$$

In the above expression, A (>0) is a constant predetermined in the inclination calculation program 511. Data representing constant A is stored on the main memory 13 in advance. The CPU 10 stores data representing the calculated effectiveness k on the main memory 13 as the effectiveness data 535. As can be appreciated from the above expression, the effectiveness k is greater in the range of 0≦k≦1 as the value of the first variable d1 is greater.

Next in step S18, an inclination vector vah is calculated. In this embodiment, the inclination vector vah is calculated using the preliminary vector vh, the previous vector vbh, and the effectiveness k. Specifically, the CPU 10 first calculates a vector (ahx', ahy') in accordance with the following expressions.

$$ahx'=(hx-bhx) \times k+bhx$$

$$ahy'=(hy-bhy) \times k+bhy$$

In the above expressions, the preliminary vector vh is (hx, hy) and the previous vector vbh is (bhx, bhy). The vector (ahx', ahy') calculated by the above expressions is directed in the same direction as the inclination vector vah. Next, the CPU 10 corrects the above-calculated vector into a unit vector in accordance with the following expressions, thus to calculate the inclination vector vah (=(ahx, ahy)).

$$ahx=ahx'/((ahx'^2+ahy'^2)^{1/2})$$

$$ahy=ahy'/((ahx'^2+ahy'^2)^{1/2})$$

The inclination vector vah is calculated by the above expressions. The CPU 10 stores data representing the calculated inclination vector on the main memory 13 as the updated inclination data 532. The CPU 10 also stores the post-update inclination data 532 on the main memory 13 as the previous data 533 to be used in the next frame for calculating an inclination vector. After step S18, the CPU 10 terminates the inclination calculation processing.

As the controller 7 is moved more violently, the value of the length L1 is farther from the magnitude of the acceleration of gravity (1 in this embodiment). Based on the length L1, the moving state of the controller 7, i.e., whether the controller 7 is being moved violently, being moved slowly, or being still, can be found. As the value of the length L1 is closer to 1, the effectiveness k is greater. Therefore, in this embodiment, the value of the effectiveness k is smaller as the controller k is moved more violently, whereas the value of the effectiveness k is greater as the controller k is closer to being still. When the controller 7 is being moved violently, it can be determined that the acceleration sensor 37 cannot accurately detect the acceleration of gravity. Therefore, the effectiveness k is smaller, and the inclination vector is closer to the previous vector. By contrast, when the controller 7 is closer to being still, it can be determined that the acceleration sensor 37 can accurately detect only the acceleration of gravity. Therefore, the effectiveness k is greater, and the inclination vector is closer to the preliminary vector. The inclination vector can be accurately calculated in step S18 by varying the ratio between the preliminary vector and the previous vector (the effectiveness k) in accordance with how reliable the output of the acceleration sensor 37 is (how accurately the output of the acceleration sensor 37 represents the acceleration of gravity).

Returning to FIG. 14, in step S4 after step S3, the game processing based on the inclination of the controller 7 calculated in step S3 is executed. Specifically, the inclination data 532 stored on the main memory 13 is transferred (output) to the program for executing the game processing, and the game processing is executed in accordance with the program. The game processing is, for example, processing of moving a player character appearing in the game space in accordance with the inclination. When the inclination is not calculated in the inclination calculation processing (i.e., when the determination result in step S12 shown in FIG. 15 is negative), the CPU 10 may execute the game processing based on an inclination represented by the previous inclination vector (previous vector) or execute the game processing assuming that the player did not provide any an input.

Next in step S5, a game image reflecting the result of the game processing executed in step S4 is generated and displayed on the monitor 2. Next in step S6, the CPU 10 determines whether or not to terminate the game. The determination in step S6 is made in accordance with, for example, whether or not the player has cleared the game, or when a time limit is provided for the game, whether or not the time has passed. When the result of determination in step S6 is negative, the processing returns to step S2 and the processing loop in steps S2 through S6 is repeated until it is determined that the game is to be terminated. When the result of determination in step S6 is positive, the CPU 10 terminates the game processing shown in FIG. 14. So far, the game processing has been described.

As described above, according to this embodiment, an inclination vector is calculated using a preliminary vector and a previous vector. Thus, the inclination of the controller 7 can be calculated in real time. By varying the degree at which the previous vector is made closer to the preliminary vector (the effectiveness k) in accordance with the magnitude of the detected acceleration, the inclination can be more accurately calculated.

In the first embodiment, an inclination of the controller 7 in the x-y directions is calculated as an example. The present invention is applicable to calculating an inclination of the controller 7 in the x-y-z directions. In this case, the length of the acceleration vector is used instead of the length L1, and the preliminary vector and the inclination vectors are calculated as three-dimensional vectors.

Second Embodiment

Next, a game system including a game apparatus as an example of an inclination calculation apparatus according to a second embodiment of the present invention will be described. The hardware structure of the game system according to the second embodiment is similar to the game system 1 according to the first embodiment. In the second embodiment, the contents of the inclination calculation processing are different from those of the first embodiment. Hereinafter, the second embodiment will be described mainly regarding the differences thereof from the first embodiment.

Figure 16:
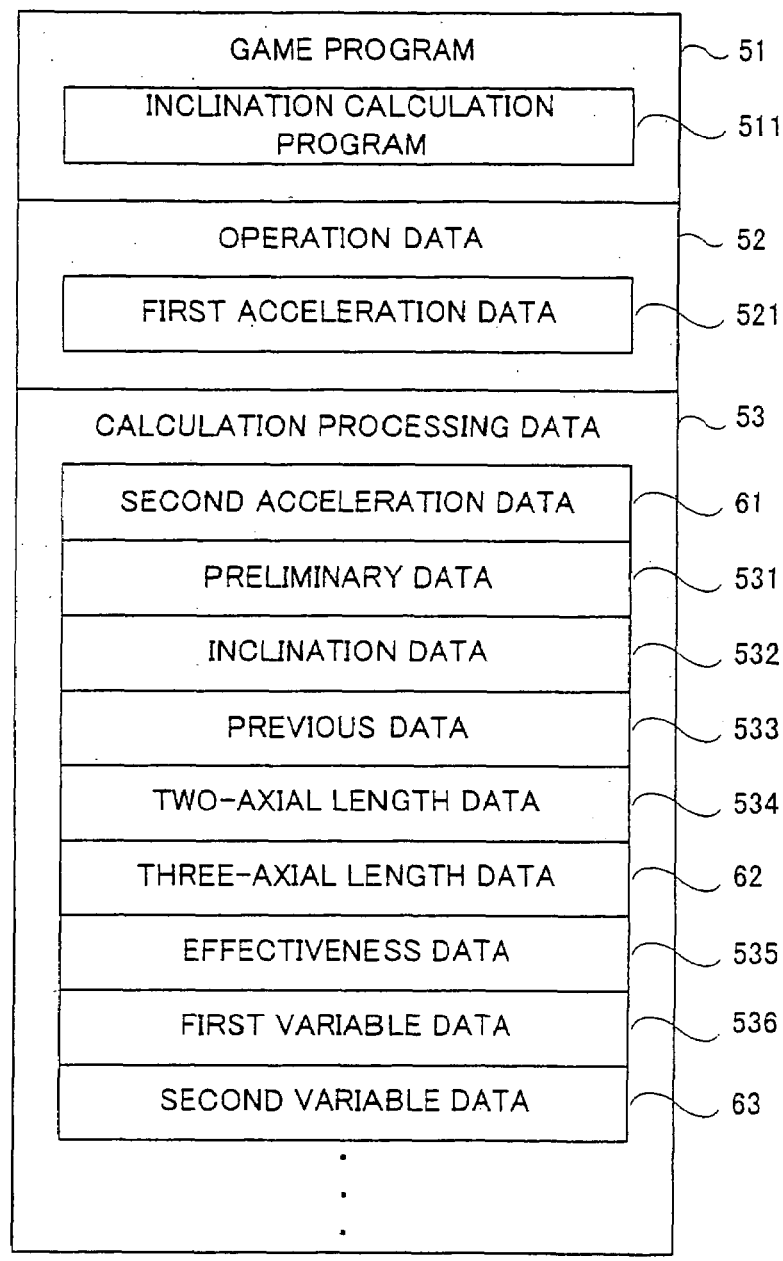
FIG. 16 shows main data stored on the main memory 13 of the game apparatus 3 in a second non-limiting example implementation.

FIG. 16 shows main data stored on the main memory 13 of the game apparatus 3 in the second embodiment. In FIG. 16, data identical as that in FIG. 13 each bear an identical reference numeral and detailed descriptions thereof will be omitted.

In the second embodiment, the calculation processing data 53 includes second acceleration data 61, three-axial length data 62, and second variable data 63 in addition to the data shown in FIG. 13. In the second embodiment, the acceleration data 521 will be referred as a "first acceleration data 521" to be distinguished from the second acceleration data 62. The first acceleration data 521 represents the same content as that of the acceleration data 521.

The second acceleration data 61 represents an acceleration detected by the acceleration sensor 37 in the x-y directions. Namely, the second acceleration data 61 is represented by a two-dimensional vector. In the second embodiment, a three-dimensional vector detected by the acceleration sensor 37 will be referred to as a "first acceleration vector Va" (=(ax, ay, az)), and the acceleration vector representing the acceleration in the x-y directions will be referred to as a "second acceleration vector Vc" (=(cx, cy)).

The three-axial length data 62 represents a length L2 of the first acceleration vector Va (a three-dimensional vector having an x component, a y component and a z component of the first acceleration vector Va).

The second variable data 63 represents a second variable d2, which indicates, in the case where the magnitude of the acceleration of gravity detected by the acceleration sensor 37 is 1, how close to 1 the length L2 of the first acceleration vector Va is. The second variable d2 is used for calculating the effectiveness k together with the first variable d1.

Figure 17:
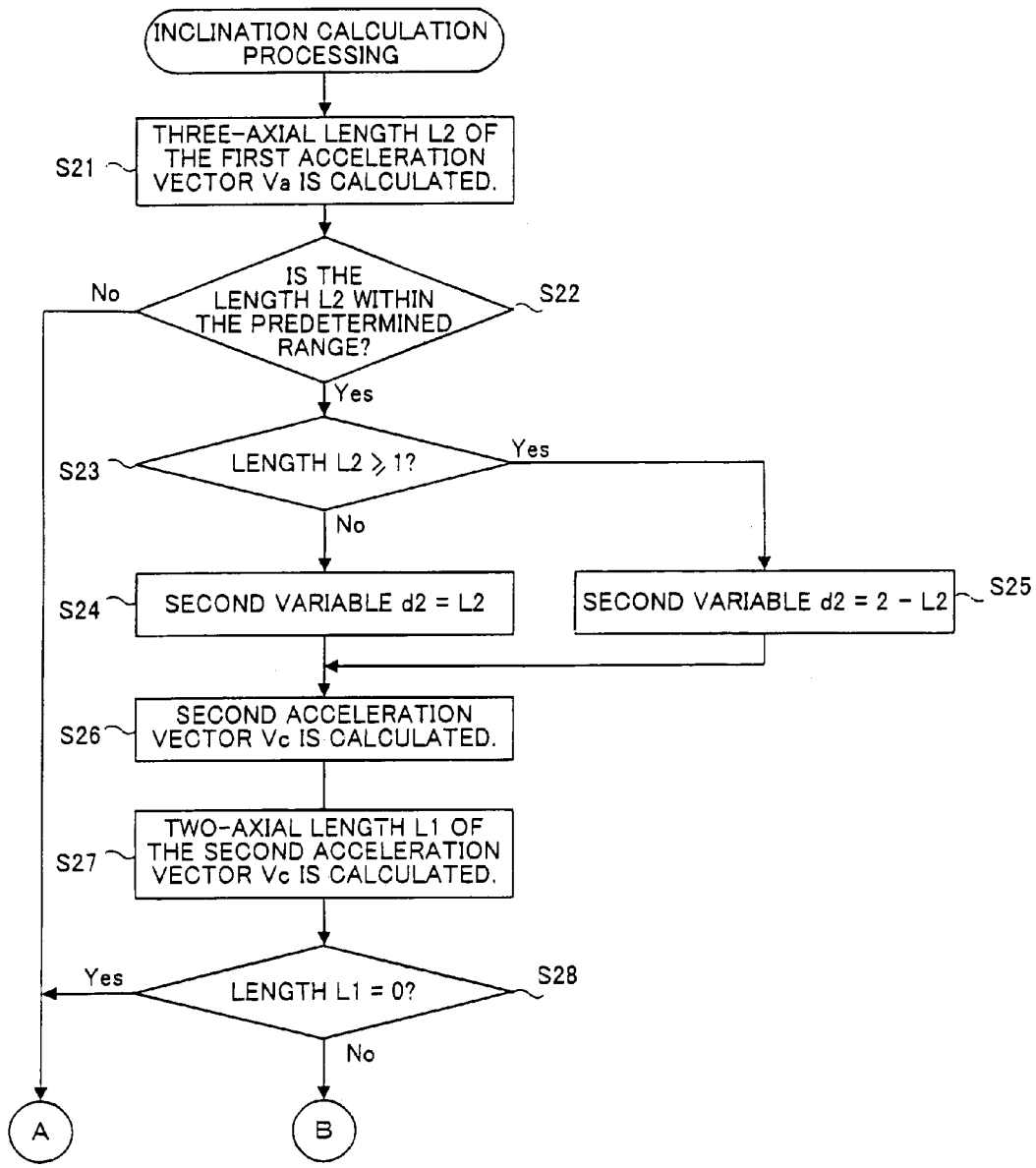
FIG. 17 is a flowchart illustrating a detailed flow of the inclination computation processing executed in the second non-limiting example implementation.
Figure 18:
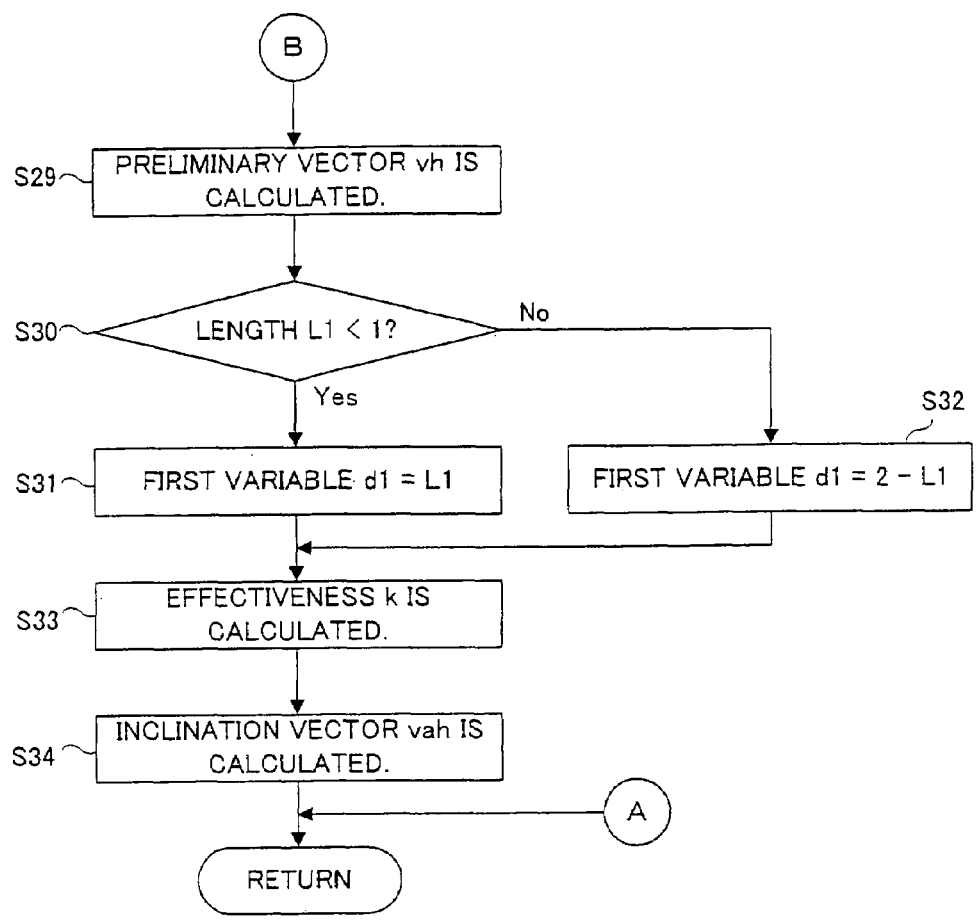
FIG. 18 is a flowchart illustrating a detailed flow of the inclination computation processing executed in the second non-limiting example implementation.

FIG. 17 and FIG. 18 are flowcharts illustrating a detailed flow of the inclination calculation processing executed in the second embodiment. Except for the inclination calculation processing shown in FIG. 17 and FIG. 18, the game processing in the second embodiment is substantially the same as that of the first embodiment.

In the second embodiment, the inclination calculation processing is executed as follows. First in step S21, a length L2 in the three axial directions of the first acceleration vector Va is calculated. When the first acceleration vector Va is (ax, ay, az), the length L2 is calculated in accordance with the following expression.

$$L2=(ax^2+ay^2+az^2)^{1/2}$$

The CPU 10 stores data representing the calculated length L2 on the main memory 13 as the three-axial length data 62.

Next in step S22, it is determined whether or not the length L2 calculated in step S21 is within a predetermined range. The predetermined range is determined in advance, and is $0<L2\leq 2$ in this embodiment. When it is determined in step S22 that the length L2 is within the predetermined range, processing in step S23 is executed. When it is determined in step S22 that the length L2 is not within the predetermined range, processing in steps S23 through S36 is skipped and the CPU 10 terminates the inclination calculation processing. Namely, when the result of the determination in step S22 is negative, the inclination of the controller 7 is not calculated. The processing in step S22, like the processing in step S12 in the first embodiment, is executed in order to prevent an inaccurate inclination of the controller 7 from being calculated when it is difficult to obtain an accurate inclination from the output of the acceleration sensor 37, i.e., when the acceleration detected by the acceleration sensor 37 includes many components other than the acceleration of gravity.

By a series of processing in steps S23 through S25, a second variable d2 is calculated based on the length L2. In the series of processing, the second variable d2 is calculated such that the value of the second variable d2 is greater within the range of $0 \leq d2 \leq 1$ as the length L2 is closer to 1. First in step S23, it is determined whether or not the length L2 is less than 1. The CPU 10 can find the value of the length L2 by referring to the three-axial length data 62 stored on the main memory 13. When it is determined in step S23 that the length L2 is less than 1, processing in step S24 is executed. When it is determined in step S23 that the length L2 is equal to or greater than 1, processing in step S25 is executed.

In step S24, the value of the length L2 is set as the value of the second variable d2. In step S25, the second variable d2 is calculated in accordance with the following expression.

$$d2=2-L2$$

Data representing the second variable d2 obtained in step S24 or S25 is stored on the main memory 13 as the second variable data 63. After step S24 or S25, processing in step S26 is executed.

In step S26, a second acceleration vector Vc is calculated based on the first acceleration vector Va. When the first acceleration vector Va is (ax, ay, az), the second vector Vc=(cx, cy) can be calculated in accordance with the following expressions.

$$cx=ax$$

$$cy=ay$$

The CPU 10 stores data representing the calculated second acceleration vector Vc on the main memory 13 as the second acceleration data 61.

Next in step S27, a length L1 of the second acceleration vector Vc in the two axial directions is calculated. The length L1 can be calculated in accordance with the following expression.

$$L1=(cx^2+cy^2)^{1/2}$$

The CPU 10 stores data representing the calculated length L1 on the main memory 13 as the two-axial length data 534.

Next in step S28, it is determined whether or not the length L1 calculated in step S27 is 0. When it is determined in step S28 that the length L1 is not 0, processing in step S29 is executed. When it is determined in step S28 that the length L1 is 0, processing in step S29 through S34 is skipped and the CPU 10 terminates the inclination calculation processing. Namely, when the result of the determination in step S28 is positive, the inclination of the controller 7 is not calculated.

It is considered that the length L1 is 0 in step S28 when, for example, the controller 7 is in the up-down direction. In this case, an inclination to be calculated, i.e., an inclination in the x-y directions cannot be calculated. Therefore, in the second embodiment, the processing after step S28 is skipped.

In step S29, a preliminary vector vh is calculated. In step S29, the preliminary vector vh can be calculated in accordance with the following expressions.

$$hx=-cy/L1$$

$$hy=-cx/L1$$

The CPU stores data representing the calculated preliminary vector vh (=(hx, hy)) on the main memory 13 as the preliminary data 531.

In the first and second embodiments, it is intended to calculate an inclination of the controller 7 in the x-y directions in the x-y-z coordinate system. This is why the preliminary vector vh is calculated as in steps S13 and S29. In the case where it is intended to calculate an inclination in a coordinate system based on a space in which the controller 7 exists, the second acceleration vector Vc (=(cx, cy)) may be calculated as follows. For example, in step S26, the second acceleration vector may be calculated in accordance with the following expressions.

$$cx=ax$$

$$cy=(ay^2+az^2)^{1/2}(ay<0), cy=-(ay^2+az^2)^{1/2}(ay\geq 0)$$

By calculating the second acceleration vector Vc in this manner, an absolute inclination in the space can be calculated.

Next, by a series of processing in steps S30 through S32, a first variable d1 is calculated based on the length L1. In the series of processing, the first variable d1 is calculated such that the value of the first variable d1 is greater within the range of $0 \leq d1 \leq 1$ as the value of the length L1 is closer to 1. The processing in steps S30 through S32 is the same as the processing in steps S14 through S16. Data representing the first variable d1 obtained in steps S31 or S32 is stored on the main memory 13 as the first variable data 53. After step S31 or S32, processing in step S33 is executed.

In step S33, an effectiveness k is calculated based on the first variable d1 and the second variable d2. Specifically, the CPU 10 calculates the effectiveness k in accordance with the following expression.

$$k=d1^2 \times d2^2 \times A$$

In the above expression, A (>0) is a constant predetermined in the inclination calculation program 511. Data representing constant A is stored on the main memory 13 in advance. The CPU 10 stores data representing the calculated effectiveness k on the main memory 13 as the effectiveness data 535. As can be appreciated from the above expression, the effectiveness k is greater in the range of $0 \leq k \leq 1$ as the value of the first variable d1 is greater and as the value of the second variable d2 is greater.

Next in step S34, an inclination vector vah is calculated. In the second embodiment, the inclination vector vah is calculated in the same manner as in the first embodiment. Namely, the processing in step S34 is the same as the processing in step S18. After step S34, the CPU 10 terminates the inclination calculation processing.

As described above, according to the second embodiment, an acceleration in the x-y-z directions is used in order to calculate an inclination of the controller 7 in the x-y directions. Specifically, in the second embodiment, the game apparatus 3 varies the effectiveness k based on the magnitude of the acceleration in the x-y-z directions (length L2). This magnitude represents the acceleration of the controller 7 more accurately than the length L1. Therefore, the moving state of the controller 7 can be more accurately determined using this magnitude. By varying the effectiveness kin accordance with this magnitude, the inclination of the controller 7 can be calculated more accurately. In the second embodiment, the effectiveness k is calculated using both the length L1 and length L2. In other embodiments, the effectiveness k may be calculated using either the length L1 or length L2.

In the first and second embodiments, the inclination of the controller 7 is represented as a vector. Alternatively, the inclination of the controller 7 may be represented by another element, for example, an angle with respect to a certain direction.

As described above, the present invention is usable for, for example, a game apparatus or a game program as described above for calculating an inclination of a device in real time using an acceleration detected by acceleration detection means.

While the invention has been described in detail, the foregoing description is in all aspects illustrative and not restrictive. It is understood that numerous other modifications and variations can be devised without departing from the scope of the invention.

What is claimed is:

1. An inclination calculation apparatus that computes an inclination of an input device, said input device having an acceleration detector capable of consecutively detecting an acceleration simultaneously in at least two axial directions, comprising:
preliminary data generation programmed logic circuitry that consecutively generates preliminary data which represents a current inclination and is uniquely determined from acceleration data obtained from the acceleration detector; and
inclination calculation programmed logic circuitry that consecutively computes a new/updated inclination based on a previously computed inclination, an acceleration due to gravity and said current inclination represented by the preliminary data, wherein said new/updated inclination is computed to have a direction oriented between said previously computed inclination and said current inclination by a degree to which the acceleration due to gravity contributes to the acceleration data.

2. An inclination calculation apparatus according to claim 1, wherein the preliminary data represents an inclination of the input device under an assumption that the acceleration data represents only an acceleration of gravity.

3. An inclination calculation apparatus according to claim 1, wherein
the acceleration detector is capable of detecting an acceleration in three axial directions;
the inclination calculation programmed logic circuitry computes an inclination in two axial directions among the three axial directions; and
the preliminary data generation programmed logic circuitry generates preliminary data representing an inclination in two axial directions, corresponding to the inclination calculated by the inclination calculation programmed logic circuitry, from the acceleration data representing the acceleration in the three axial directions.

4. An inclination calculation apparatus according to claim 1, further comprising magnitude calculation programmed logic circuitry that computes a magnitude of the acceleration represented by the acceleration data,
wherein the inclination calculation programmed logic circuitry consecutively computes and updates said new/updated inclination in accordance with the magnitude of the acceleration, such that the direction of the new/updated inclination is made closer to said current inclination as the magnitude of the acceleration calculated by the magnitude calculation programmed logic circuitry is closer to a magnitude of an acceleration due to gravity.

5. An inclination calculation apparatus according to claim 1, further comprising magnitude calculation programmed logic circuitry that computes a magnitude of the acceleration represented by the acceleration data,
wherein the inclination calculation programmed logic circuitry computes an inclination only when a difference between the computed magnitude of the acceleration and a magnitude of an acceleration due to gravity is within a predetermined range.

6. A computer-readable storage medium having stored thereon a plurality of inclination calculation program instructions executable by a computer for computing an inclination of an input device, said input device having an acceleration detector capable of consecutively detecting an acceleration simultaneously in at least two axial directions, the inclination calculation program instructions causing the computer to:
consecutively generate preliminary data which represents a current inclination of said input device, the preliminary data being uniquely determined from acceleration data obtained from the acceleration detector; and
consecutively compute new/updated values for inclination based on a previously computed inclination, an acceleration due to gravity and said current inclination represented by the preliminary data, wherein said new/updated inclination is computed to have a direction oriented between said previously computed inclination and said current inclination by a degree to which the acceleration due to gravity contributes to the acceleration data.

7. A storage medium according to claim 6, wherein the preliminary data represents an inclination of the input device under an assumption that the acceleration data represents only an acceleration of gravity.

8. A storage medium according to claim 6, wherein the acceleration detector is capable of detecting an acceleration in three axial directions;
the computer calculates an inclination in two axial directions among the three axial directions; and
the computer generates preliminary data representing an inclination in two axial directions, corresponding to the computed inclination, from the acceleration data representing the acceleration in the three axial directions.

9. A storage medium according to claim 6, wherein the inclination calculation program instructions further cause the computer to:
compute a magnitude of the acceleration represented by the acceleration data; and
when computing an inclination, consecutively update said new/updated inclination in accordance with the magnitude of the acceleration, such that the direction of the new/updated inclination is made closer to said current inclination as a computed magnitude of the acceleration becomes closer to a magnitude of the acceleration of gravity.

10. A storage medium according to claim 6, wherein the inclination calculation program instructions further cause the computer to:
compute a magnitude of the acceleration represented by the acceleration data; and
compute an inclination only when a difference between the computed magnitude of the acceleration and a magnitude of the acceleration due to gravity is within a predetermined range.

11. A game apparatus that computes an inclination of an input device, said input device having an acceleration detector capable of consecutively detecting an acceleration simultaneously in at least two axial directions and using the computed inclination as an operation input for a game, the game apparatus comprising:
  preliminary data generation programmed logic circuitry that consecutively generates preliminary data which represents a current inclination and is uniquely determined from acceleration data output from the acceleration detector; and
  inclination calculation programmed logic circuitry that consecutively computes a new/updated inclination based on a previously computed inclination, an acceleration due to gravity and said current inclination represented by the preliminary data, wherein said new/updated inclination is computed to have a direction oriented between said previously computed inclination and said current inclination by a degree to which the acceleration due to gravity contributes to the acceleration data.

12. A game apparatus according to claim 11, wherein the preliminary data represents an inclination of the input device under an assumption that the acceleration data represents only an acceleration of gravity.

13. A game apparatus according to claim 11, wherein the acceleration detector is capable of detecting an acceleration in three axial directions;
  the inclination calculation programmed logic circuitry computes an inclination in two axial directions among the three axial directions; and
  the preliminary data generation programmed logic circuitry generates preliminary data representing an inclination in two axial directions, corresponding to the inclination calculated by the inclination calculation programmed logic circuitry, from the acceleration data representing the acceleration in the three axial directions.

14. A game apparatus according to claim 11, further comprising magnitude calculation programmed logic circuitry that computes a magnitude of the acceleration represented by the acceleration data,
  wherein the inclination calculation programmed logic circuitry consecutively computes and updates said new/updated inclination in accordance with the magnitude of the acceleration, such that the direction of the new/updated inclination is made closer to said current inclination as the magnitude of the acceleration calculated by the magnitude calculation programmed logic circuitry is closer to a magnitude of an acceleration due to gravity.

15. A game apparatus according to claim 11, further comprising magnitude calculation programmed logic circuitry that computes a magnitude of the acceleration represented by the acceleration data,
  wherein the inclination calculation programmed logic circuitry computes an inclination only when a difference between the computed magnitude of the acceleration and a magnitude of an acceleration due to gravity is equal to or less within a predetermined range.

16. A computer-readable storage medium having stored thereon a plurality of game program instructions executable by a computer of a game apparatus for computing an inclination of an input device, said input device having an acceleration detector capable of consecutively detecting an acceleration simultaneously in at least two axial directions and using the computed inclination as an operation input for a game, the game program causing the computer to:
  consecutively generate preliminary data which represents a current inclination of said input device, the preliminary data being uniquely determined from acceleration data obtained from the acceleration detector; and
  consecutively compute new/updated values for inclination based on a previously computed inclination, an acceleration due to gravity and said current inclination represented by the preliminary data, wherein said new/updated inclination is computed to have a direction oriented between said previously computed inclination and said current inclination by a degree to which the acceleration due to gravity contributes to the acceleration data.

17. A storage medium according to claim 16, wherein the preliminary data represents an inclination of the input device under an assumption that the acceleration data represents only an acceleration of gravity.

18. A storage medium according to claim 16, wherein the acceleration detector is capable of detecting an acceleration in three axial directions;
  the computer calculates an inclination in two axial directions among the three axial directions; and
  the computer generates preliminary data representing an inclination in two axial directions, corresponding to the computed inclination, from the acceleration data representing the acceleration in the three axial directions.

19. A storage medium according to claim 16, wherein the inclination calculation program instructions further cause the computer to:
  compute a magnitude of the acceleration represented by the acceleration data; and
  when computing an inclination, consecutively update said new/updated inclination in accordance with the magnitude of the acceleration, such that the direction of the new/updated inclination is made closer to said current inclination as a computed magnitude of the acceleration becomes closer to a magnitude of the acceleration of gravity.

20. A storage medium according to claim 16, wherein the inclination calculation program instructions further cause the computer to:
  compute a magnitude of the acceleration represented by the acceleration data; and
  compute an inclination only when a difference between the computed magnitude of the acceleration and a magnitude of the acceleration due to gravity is within a predetermined range.

* * * * *